(12) United States Patent
Bond et al.

(10) Patent No.: US 9,468,204 B2
(45) Date of Patent: Oct. 18, 2016

(54) TRAP

(75) Inventors: Craig Richard Bond, Wellington (NZ); Robert Blair van Dam, Wellington (NZ); Stuart William Barr, Wellington (NZ)

(73) Assignee: Goodnature Limited, Wellington (NZ)

(*) Notice: Subject to any disclaimer, the term of this patent is extended or adjusted under 35 U.S.C. 154(b) by 706 days.

(21) Appl. No.: 13/201,769

(22) PCT Filed: Mar. 3, 2010

(86) PCT No.: PCT/NZ2010/000037
§ 371 (c)(1),
(2), (4) Date: Aug. 16, 2011

(87) PCT Pub. No.: WO2010/101481
PCT Pub. Date: Sep. 10, 2010

(65) Prior Publication Data
US 2011/0296739 A1    Dec. 8, 2011

(30) Foreign Application Priority Data
Mar. 4, 2009  (NZ) .................................. 575339

(51) Int. Cl.
*A01M 27/00*  (2006.01)
*A01M 23/36*  (2006.01)
*A01M 23/14*  (2006.01)

(52) U.S. Cl.
CPC ............. *A01M 27/00* (2013.01); *A01M 23/14* (2013.01); *A01M 23/36* (2013.01)

(58) Field of Classification Search
CPC ..... A01M 23/26; A01M 27/00; A01M 23/14

USPC ............................ 43/77–80, 75, 73; 227/130
See application file for complete search history.

(56) References Cited

U.S. PATENT DOCUMENTS

| 3,375,758 A | * | 4/1968 | Novak et al. ................. 227/130 |
| 3,496,840 A | * | 2/1970 | Dorney et al. ................ 227/130 |
| 3,527,142 A | * | 9/1970 | Obergfell ................ B25C 1/041 |
| | | | 227/130 |
| 3,673,922 A | * | 7/1972 | Doyle .......................... 227/130 |

(Continued)

FOREIGN PATENT DOCUMENTS

| CA | 1289109 | 9/1991 |
| DE | 4441928 | 5/1996 |

(Continued)

OTHER PUBLICATIONS

Goodnature Limited, PCT Search Report and Written Opinion mailed Aug. 11, 2010, PCT Appln. No. PCT/NZ2010/000037 filed Mar. 3, 2010, 16 pages.

(Continued)

*Primary Examiner* — Darren W Ark
(74) *Attorney, Agent, or Firm* — Thomas Coester Intellectual Property; Thomas M. Coester

(57) ABSTRACT

An animal trap is powered by compressed gas and includes a trigger mechanism and kill mechanism. The trap is preferably self-resetting. A variety of sources of compressed gas may be used, and different kill mechanisms may also be used. The trap is particularly suited to applications where low-maintenance traps are required, because it uses a simple, reliable mechanism which can kill a number of animals over a long period of time without requiring maintenance or manual resetting.

22 Claims, 21 Drawing Sheets

(56) References Cited

U.S. PATENT DOCUMENTS

| | | | |
|---|---|---|---|
| 3,774,293 A * | 11/1973 | Golsch | 227/130 |
| 3,815,475 A * | 6/1974 | Howard et al. | 227/130 |
| 3,815,476 A * | 6/1974 | Green et al. | 227/130 |
| 3,822,819 A * | 7/1974 | Wilson et al. | 227/130 |
| 3,893,610 A * | 7/1975 | Smith | 227/130 |
| 3,945,551 A * | 3/1976 | Sato et al. | 227/130 |
| 4,000,578 A | 1/1977 | Souza | |
| 4,294,391 A * | 10/1981 | Obergfell | 227/130 |
| 4,349,980 A * | 9/1982 | McKee | 43/81 |
| 4,483,094 A * | 11/1984 | McKee | 43/81 |
| 4,567,688 A * | 2/1986 | McKee | 43/61 |
| 4,596,087 A * | 6/1986 | Pratscher | 43/79 |
| 4,653,221 A * | 3/1987 | Pratscher | 43/79 |
| 4,669,216 A * | 6/1987 | Moss | A01M 27/00 43/73 |
| 4,741,121 A * | 5/1988 | Pratscher et al. | 43/74 |
| 4,747,338 A * | 5/1988 | Crutcher | 91/461 |
| 4,986,164 A * | 1/1991 | Crutcher | 91/461 |
| 5,224,287 A * | 7/1993 | Knudsen | 43/81 |
| 5,548,922 A | 8/1996 | Wefler | |
| 6,553,712 B1 | 4/2003 | Majerowski et al. | |
| 6,763,990 B2 * | 7/2004 | Lee | 227/130 |
| 6,832,447 B2 * | 12/2004 | Domigan et al. | 43/94 |
| 7,036,704 B2 * | 5/2006 | Nayrac et al. | 227/130 |
| 7,322,505 B2 * | 1/2008 | Ishizawa et al. | 227/130 |
| 7,360,671 B2 | 4/2008 | Slade | |
| 7,757,428 B2 * | 7/2010 | Lovett | 43/78 |
| 2007/0119094 A1 * | 5/2007 | Ouzts | 43/84 |
| 2007/0266618 A1 | 11/2007 | Sturgeon et al. | |
| 2008/0092431 A1 * | 4/2008 | Fritzboger | 43/79 |
| 2011/0056117 A1 * | 3/2011 | Fritzboger | 43/73 |
| 2011/0296739 A1 | 12/2011 | Bond et al. | |
| 2014/0059917 A1 * | 3/2014 | Bond et al. | 43/78 |

FOREIGN PATENT DOCUMENTS

| | | | |
|---|---|---|---|
| EP | 1400172 A1 * | 3/2004 | A01M 23/36 |
| NZ | 233907 | 6/1990 | |
| NZ | 240098 | 10/1991 | |
| NZ | 512101 | 6/2004 | |
| NZ | 531052 | 9/2004 | |
| WO | WO-0258461 | 5/2002 | |
| WO | WO-2006044171 | 4/2006 | |

OTHER PUBLICATIONS

McDonald, et al., "New Technology for Poison Delivery", *NZ Journal of Ecology*—1992 23(2): 289-292, (1999).

O'Conor, et al., "Palatability of rodent baits to wild house mice", *Science for Conservation 184, Department of Conservation*, Sep. 2001.

Thomas, et al., "A rat-resistant bait for kill traps", *Project No. R80617—Prepared for Animal Health Board*, Jun. 2004.

* cited by examiner

TRAP

CROSS-REFERENCE TO RELATED APPLICATION

The present patent application is a national phase application of International Application No. PCT/NZ2010/000037, filed Mar. 3, 2010.

FIELD OF THE INVENTION

The invention relates to traps for killing animals.

BACKGROUND TO THE INVENTION

Known animal traps generally include some form of trigger with a mechanical kill mechanism powered by a spring. Traps are used to kill various pests, including (in New Zealand) mice, rats, stoats, possums and ferrets. In other countries, other pests are of course present.

Known traps generally include three types of trap. Cage traps capture animals alive and allow non target species to be released. Target species are killed by the trapper, which has the advantage that the animal's fur can be more easily removed while the animal is still warm. Leg hold and snare traps physically hold an animal by securely holding its leg. These traps also capture the animal alive and are much lighter and more compact than cage traps.

The third type of trap is the kill trap, which automatically kills animals rather than capturing them alive. These traps generally kill and retain an animal, and therefore require a user to empty and reset the trap. Some users find emptying a trap disagreeable and in some circumstances it may not be practical or may reduce the efficiency of a pest control programme. For example, stoat traps are widely distributed through New Zealand forests. These traps are emptied periodically—approximately every four weeks. This requires significant labour, since rangers are required to walk the trap line clearing the traps. In addition, if a trap is triggered soon after being checked it will be out of action for most of the four week period.

It is an object of the invention to provide an improved trap, or at least to provide the public with a useful choice.

SUMMARY OF THE INVENTION

In a first aspect the invention provides a trap including:
a source of compressed gas;
a trigger mechanism configured to be actuated by an animal; and
a kill mechanism powered by compressed gas;
wherein, when the trigger mechanism is actuated by an animal, gas flows to actuate the kill mechanism to kill the animal.

Preferably the kill mechanism is configured to automatically release a killed animal and to reset so as to be ready to kill a further animal.

Preferably a biasing arrangement is configured to drive the resetting of the trap.

Alternatively the resetting of the trap is driven by gas pressure.

Preferably the trap is configured to target a particular animal or group of animals. The target animal or animals may be drawn from the group: rats, stoats, possums, ferrets, birds, mongoose, muskrat, mink, beaver, nutria, squirrel, snakes, monitor lizards, cats, foxes, dogs and ungulets.

Preferably the compressed gas is carbon dioxide or air.

Preferably the source of compressed gas is a replaceable canister. Alternatively the source of compressed gas may be a reservoir configured to be re-pressurised by a user.

Preferably a regulator is positioned between the source of compressed gas and the kill mechanism for regulating the pressure of the compressed gas.

Preferably the trigger mechanism includes a trigger valve, such that flow allowed or restricted by the actuated trigger valve causes actuation of the kill mechanism.

Preferably the trigger mechanism is configured to be actuated by pivotal movement under the weight of an animal of at least part of the trap with respect to a support.

Preferably the trap includes a trap body pivotally mounted in a housing mounted to the support, wherein the trigger mechanism includes a trigger valve carried by the trap body and positioned to press against a surface of the housing when the trap body pivots with respect to the housing under the weight of an animal, thereby actuating the trigger valve.

Preferably the trigger mechanism includes a trigger actuator and a trigger valve, wherein the trigger actuator is configured to be actuated by an animal and to cause actuation of the trigger valve.

Preferably the trigger actuator is a biter, mechanical treadle or lever, or electronic or optical sensor actuator.

Preferably the trap includes:
a diaphragm; and
a trigger valve;
wherein in a setting, resetting or ready state pressure acts on one surface of the diaphragm to prevent flow of compressed gas to the kill mechanism;
and wherein, when an animal actuates the trigger valve flow through the trigger valve alters a pressure difference across the diaphragm, causing movement of the diaphragm which allows compressed gas to flow to the kill mechanism to actuate the kill mechanism.

Preferably the diaphragm is formed from a resilient material. Preferably the resilient material is a nitrile or polyurethane or polyester material.

Preferably the trap includes an intermediate reservoir, wherein the diaphragm includes a hole allowing gas to flow from the source of compressed gas, through the diaphragm to the intermediate reservoir. Preferably the intermediate reservoir is an annular reservoir surrounding a central cylinder in which a piston of the kill mechanism rides.

Preferably, in a setting, resetting or ready state the diaphragm blocks the end of the central cylinder, and the movement of the diaphragm when an animal actuates the trigger is away from the end of the central cylinder such that gas flows from the intermediate reservoir into the central cylinder to act on the piston.

Preferably the trap includes an intermediate reservoir, wherein in a setting or resetting phase compressed gas is allowed to flow to fill the intermediate reservoir, and when an animal actuates the trigger valve compressed gas flows from the intermediate reservoir to the kill mechanism to actuate the kill mechanism.

Preferably the kill mechanism includes a piston actuated by compressed gas.

Preferably the kill mechanism includes a hammer or spike configured to strike an animal.

Alternatively the kill mechanism includes a cutting element configured to kill the animal by decapitation or other cutting action.

Alternatively the kill mechanism includes a constriction mechanism configured to constrict around an animal for a predetermined period of time sufficient to kill the animal. Preferably the constriction mechanism includes one or more of: a noose, cord, strap, cable, or moving bar arrangement configured to constrict around the animal. Preferably the predetermined period of time is at least three minutes. Preferably the trap includes a time delay arrangement to cause release of the animal and resetting of the trap at the end of the predetermined period.

Preferably the trap includes an enclosure surrounding at least part of the trap and providing an entrance for an animal.

Preferably the trap includes a bait arrangement or lure for attracting the animal.

In a second aspect the invention provides a trap including a trap body, the trap body carrying a trigger mechanism and a kill mechanism, actuation of the kill mechanism being caused by actuation of the trigger mechanism by an animal, wherein:

the trap body is configured to be pivotally mounted to a support; and the trigger mechanism is configured to be actuated by pivotal movement of the trap body with respect to the support under the weight of an animal.

In a third aspect the invention provides a trap power unit including:

a source of compressed gas or an arrangement for connection of a source of compressed gas;

a trigger mechanism configured to be actuated by an animal; and a kill mechanism attachment arrangement configured to attach a kill mechanism powered by compressed gas.

In a fourth aspect the invention provides a trap kit including a trap power unit according to the third aspect and a kill mechanism configured to attach to the kill mechanism attachment arrangement.

BRIEF DESCRIPTION OF THE DRAWINGS

The invention will now be described by way of example only, with reference to the accompanying drawings, in which.

DETAILED DESCRIPTION

Figure 1:
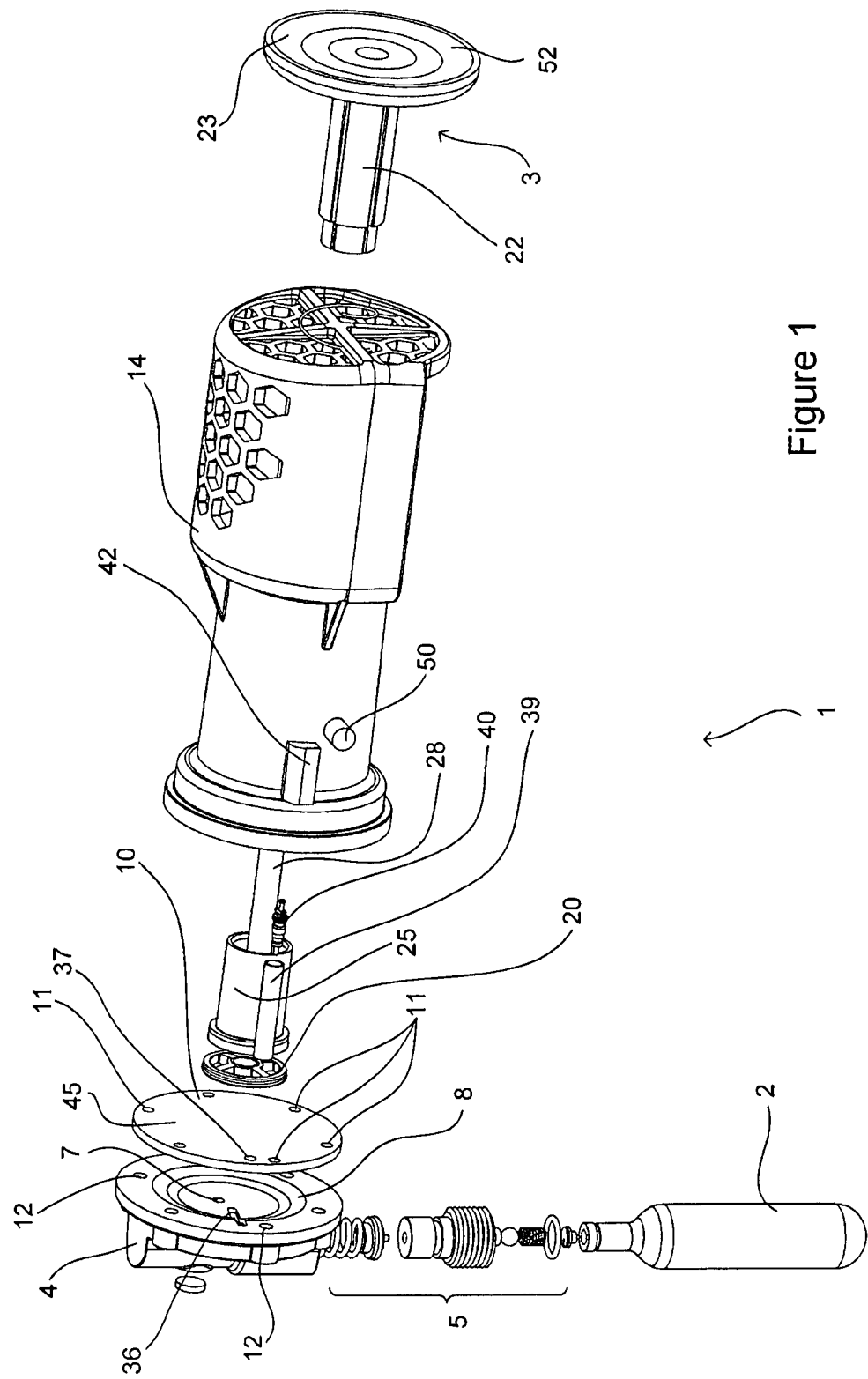
FIG. 1 is an exploded view of a trap according to one embodiment.
Figure 2:
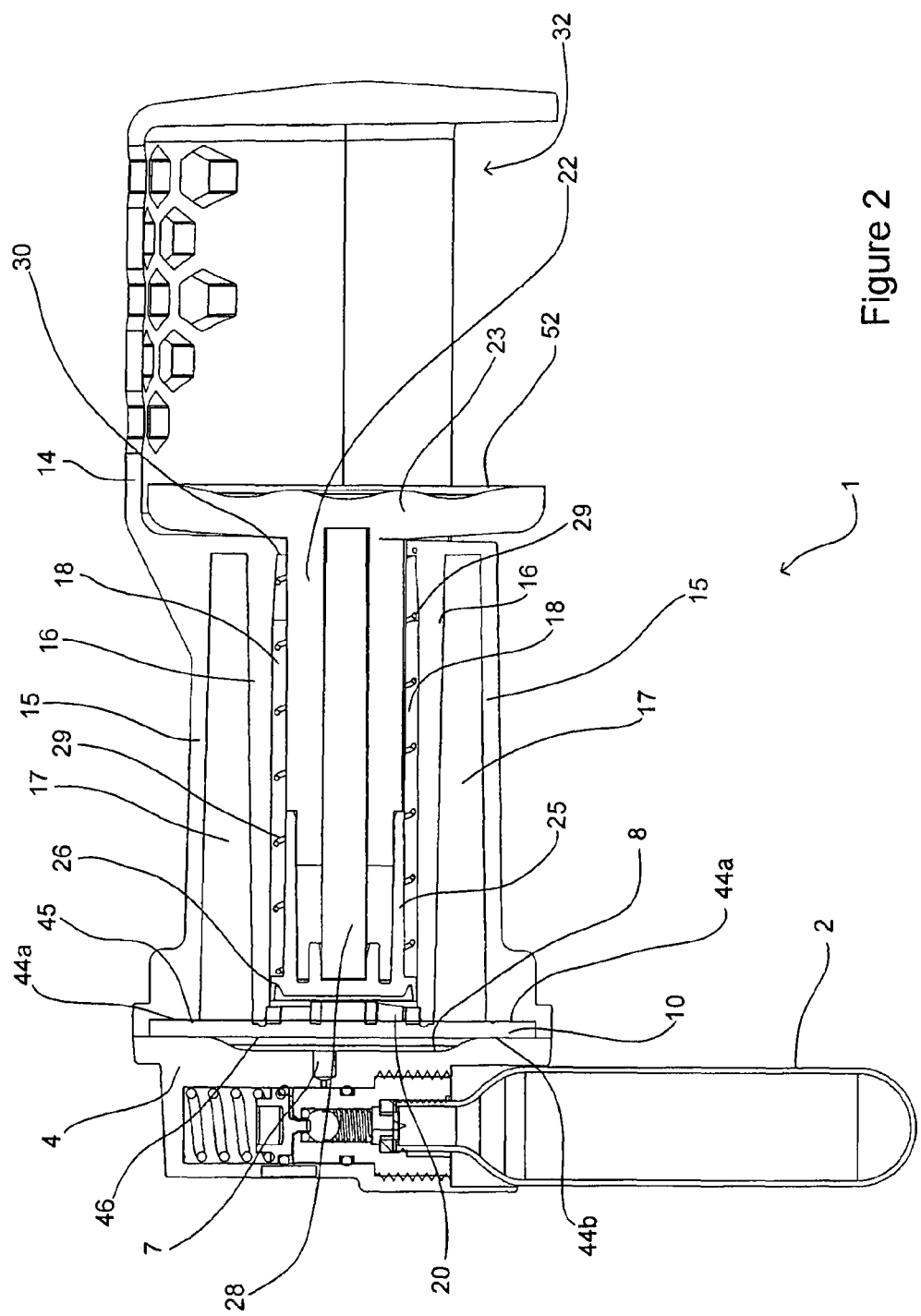
FIG. 2 is a cross-section through the trap of FIG. 1.
Figure 3:
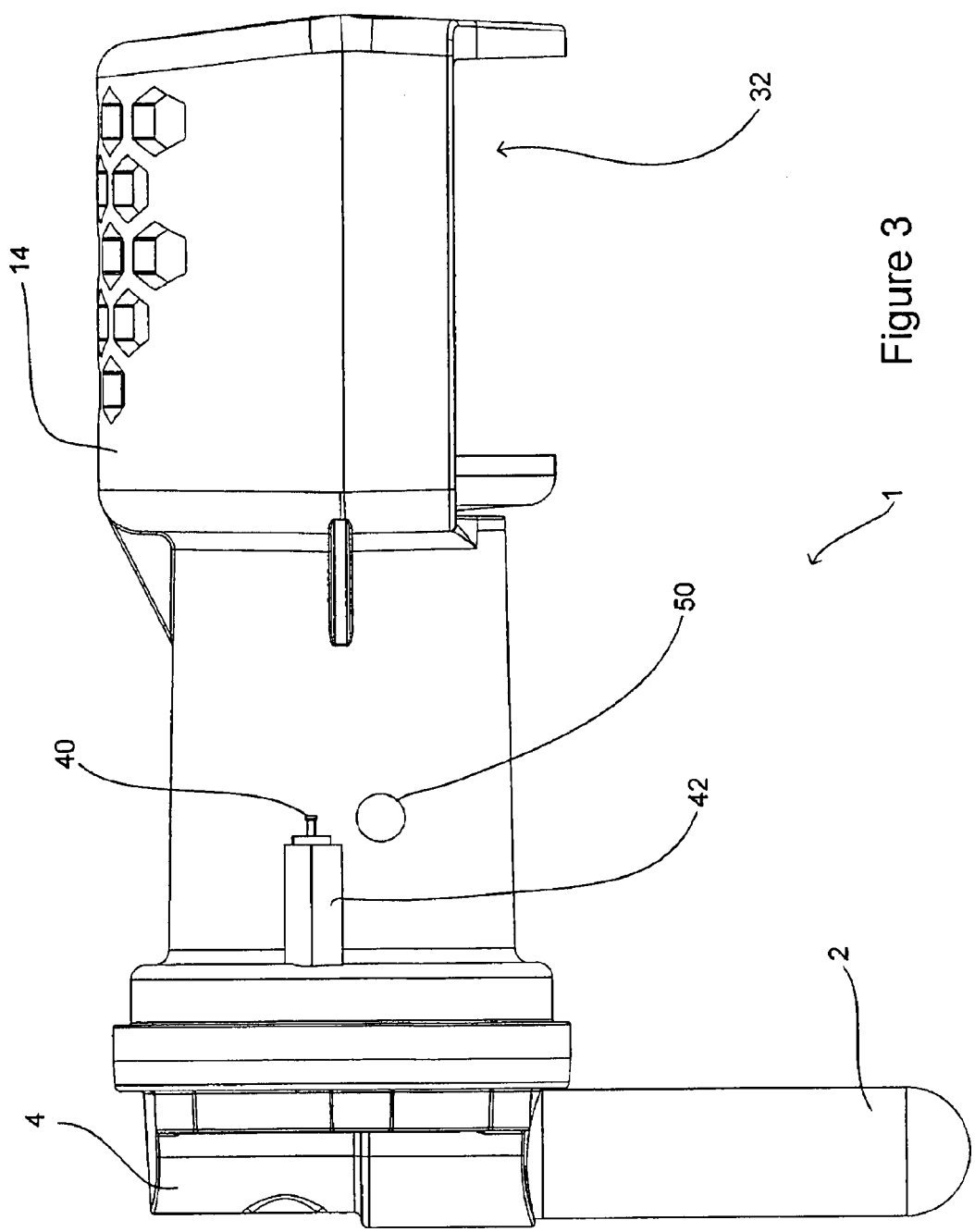
FIG. 3 is a side view of the trap of FIG. 1.

FIG. 1 is an exploded view, FIG. 2 is a cross-section and FIG. 3 is a side view of a trap 1 according to one embodiment. The trap 1 includes a source of compressed gas 2, in the embodiment shown as a canister. The trap 1 also includes a flow control arrangement (described in detail below) designed to control gas flow for operation of a kill mechanism 3 by compressed gas drawn from source 2.

The source 2 of compressed gas may be a canister (such as a readily available $CO_2$ canister) cylinder or any form of suitable reservoir for holding pressurised gas. The gas may be stored in a solid form within the source, being released from the source as a gas (as is the case with some $CO_2$ canisters). Such canisters are easily replaced when empty or as part of a routine servicing of the trap. Other sources of compressed gas can be re-pressurised. For example, some reservoirs could be re-pressurised using a bicycle pump or suitable electric pump. The use of compressed gas therefore provides a cheap, low-maintenance, reliable and versatile power source for the trap. Other suitable compressed gas sources may occur to the skilled reader. The compressed gas is preferably cheap and readily available, for example compressed carbon dioxide or air.

In the embodiment shown, the source 2 of compressed gas is connected to a regulator cap 4 in which a regulator assembly 5 is provided. The regulator assembly allows the pressure provided by the source 2 to be controlled, as will be easily understood by a skilled reader. In one embodiment the regulator assembly 5 reduces the pressure of a $CO_2$ gas source at around 200 to 3000 psi to an operating pressure of around 100 psi.

Gas flows from the source 2, through the regulator assembly 5 and then through a flow path 7 formed in the regulator cap 4. This flow path 7 leads to a front surface 8 of the regulator cap 4.

A diaphragm 10 is mounted next to the front surface 8 of the regulator cap 4. The diaphragm 10 is preferably formed from a flat resilient material. Nitrile or polyurethane (e.g. thermoplastic polyurethane) materials may be suitable. Although profiled diaphragms may be suitable for some applications, the flat material is expected to be less costly. Moulded diaphragms are suitable for some applications, however, and are described below. A particularly suitable material for moulded diaphragms has been found in Hytrel®, a thermoplastic polyester elastomer produced by Dupont. This material works well at low temperatures and is relatively easily moulded.

In the embodiment shown, the diaphragm 10 includes a number of holes 11 which cooperate with holes 12 in the regulator cap 4 and similar holes (not shown) in the trap body 14, allowing bolts or other fasteners to be used in assembly of the trap 1. The trap body 14 is therefore assembled to the regulator cap 4, as shown in FIG. 2.

The trap body 14 includes a generally cylindrical outer wall 15 and a generally cylindrical inner wall 16. These walls define an annular intermediate reservoir 17. The inner wall also defines an inner cylinder 18. The geometry of the walls, reservoir and cylinder provides a simple and compact trap body which can be made by plastic moulding processes. However, many other geometries may be suitable and fall within the scope of the Applicant's invention.

A bridge 20 is fitted to the end of the inner cylinder 18. The bridge 20 allows gas to flow through it and remains stationary during operation. Its function is simply to prevent the diaphragm 10 from being forced into the inner cylinder 18 during operation of the trap.

A piston rides in the inner cylinder 18. The piston drives the kill mechanism 3 and in the embodiment shown is formed in two pieces. A first piece 22 is formed integrally with the hammer 23 of the kill mechanism 3. A second piece 25 attaches to the end of the first piece 22 and includes a wider flange 26 which forms a loose seal with the inner surface of the inner cylinder 18. This two part construction also allows a steel (or other suitable material) rod 28 to be inserted into the middle of the piston. This rod simply increases the weight of the kill mechanism 3. For stoats and rats, for example, the steel rod preferably increases the weight of the kill mechanism to at least 130 grams (around 4.6 ounces).

Clearly the piston can be formed integrally with the kill mechanism or as a separate piece.

A spring 29 (see FIG. 2) sits in the inner cylinder 18 and acts between a surface 30 at the base of the inner cylinder 18 and the flange 26 on the piston. The spring therefore biases the piston and/or kill mechanism 3 into the position shown in FIG. 2.

The trap body 14 preferably extends beyond the kill mechanism 3 to define an entrance chamber 32.

The flow arrangement used in the trap 1 will now be discussed. The flow arrangement includes a number of flow paths and a flow control arrangement configured to control flow through the flow paths.

Compressed gas from the source 2 flows through the regulator assembly 5 and regulator cap 4, arriving at the front surface 8 of the regulator cap 4 via the flow path 7 discussed above. A groove 36 is formed in the front surface 8 and aligns in the assembled trap with a hole 37 formed in the diaphragm 10. Gas can therefore flow via the groove 36 and hole 37 through the diaphragm 10.

A pipe or tube section 39 aligns with the hole 37 on the other, front side of the diaphragm 10. A trigger valve 40, preferably a conventional Schrader valve, is mounted in the end of the pipe or tube section 39. In the assembled trap 1, the pipe or tube section 39 extends into the valve cover 42 formed on the outside wall of the trap body 14, as shown in FIG. 3. In the embodiment shown, the trigger valve does not allow gas to flow through it unless it is triggered by an animal.

Figure 4:
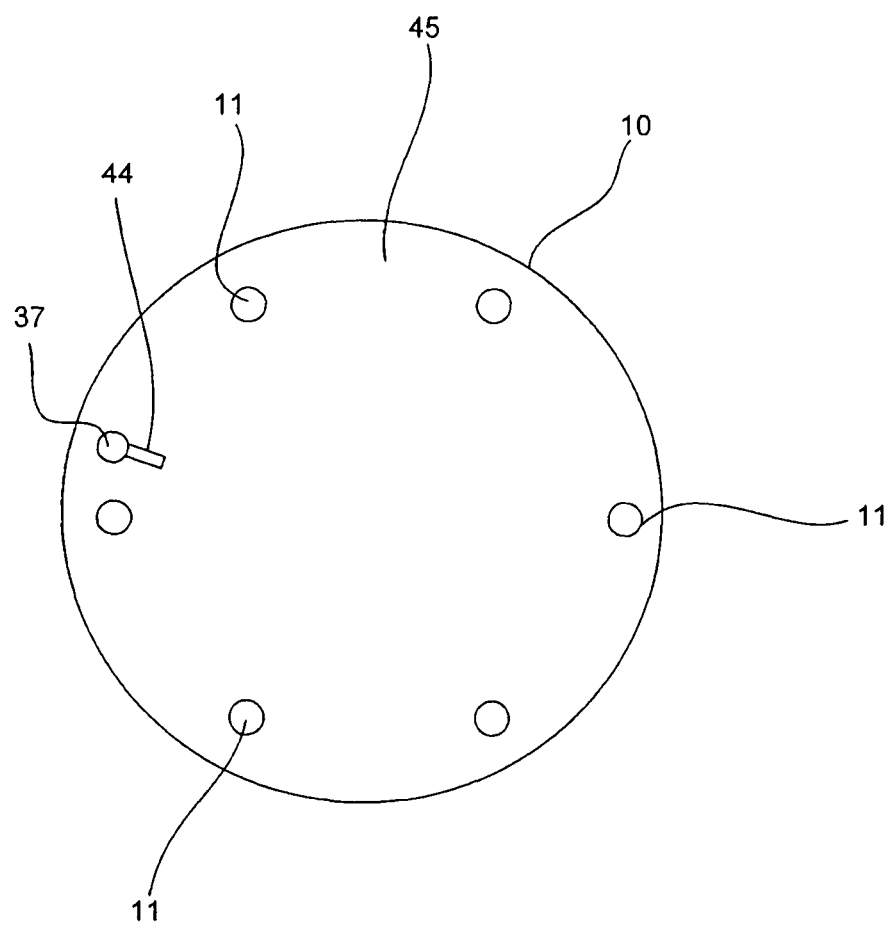
FIG. 4 shows a diaphragm from the trap of FIG. 1.

The diaphragm also includes a short groove 44 (see FIG. 4) which communicates with the hole 37 on the front surface 45 of the diaphragm 10. (The groove 44 could alternatively be provided in the wall 44a of the trap body 14.) In the assembled trap, the edge of the diaphragm is sandwiched between the surface 44a of the trap body 14 and the surface 44b of the regulator cap 4.

When the trigger valve is closed, compressed gas flows along the groove 36, through the hole 37, along the groove 44 and into the intermediate reservoir 17. During this process, the diaphragm effectively seals the inner cylinder 18 because pressure acts against the back surface 46 of the diaphragm 10, forcing the front surface 45 of the diaphragm 10 against the end of the inner wall 16.

To aid this sealing, an offset can be provided by making the inner wall 16 protrude slightly further (to the left as shown in FIG. 2) than the surface 44a which supports the front surface 45 of the diaphragm. The diaphragm therefore bends slightly around the end of the inner wall 16, to ensure a good seal at this point. In addition, the groove 44 is preferably smaller in cross-section than the groove 36 in the regulator cap 4. This ensures that the diaphragm seals off flow to the inner cylinder 18 before gas flows into the intermediate reservoir 17.

Gas will continue to flow in this way until the pressure in the intermediate reservoir is sufficiently high to resist further flow. The seal of the diaphragm 10 against the inner wall 16 will be maintained due to the offset and the pressure acting on the back surface 46, which is of course greater than any pressure inside the inner cylinder 18.

The trap is now in a 'ready' state. When an animal actuates a trigger mechanism the trap will operate to kill the animal. This trigger mechanism will now be described.

The trap body 14 includes a pivot connector 50. This pivot connector 50 is configured to be received in a housing (described below) such that the entire trap body 14 is able to pivot about an axis defined by the pivot connector 50 with respect to the housing. The housing, in use, can be attached to a support such as a tree, post, building etc by any suitable conventional means. The housing also provides a trigger surface near to the end of the trigger valve 40. When an animal enters the trap, it applies its weight to the trap body 14 which pivots under that weight with respect to the stationary housing. This causes the end of the trigger valve 40 to press against the trigger surface, thereby opening the trigger valve 40.

When the trigger valve 40 is opened in this way, gas flows from behind the diaphragm 10, through the hole 37 in the diaphragm, through the pipe or tube section 39 and out through the trigger valve 40. This releases the pressure behind the diaphragm. The pressure in the intermediate reservoir is now sufficient to force the diaphragm to the left (as shown in the drawings) which allows gas to flow from the intermediate reservoir around the end of the inner wall 16, through the bridge 20 and into the central cylinder 18, where it acts on the piston to drive the kill mechanism 3 suddenly and forcefully to the right to strike the animal.

As the flange 26 forms a loose seal in the inner cylinder 18, the pressure acting on the kill mechanism dissipates by leaking past the flange 26 and into the entrance chamber 32. This reduction in pressure allows the piston to return to the left under the restoring force of the spring 29. The animal is released and falls from the trap 1, allowing the trap to pivot back to its original position, closing the trigger valve 40. This pivoting is simply driven by the weight of the trap body 14, by appropriate positioning of its centre of gravity with respect to the pivot point. The diaphragm 10 again seals the inner cylinder 18 because of the offset described above and the pressure applied by compressed gas flowing from the source 2. Pressure can then build up again within the intermediate reservoir, readying the trap to kill a further animal.

Alternatively, gas pressure could be used to drive the resetting of the kill mechanism, rather than a spring 29.

Figure 5:
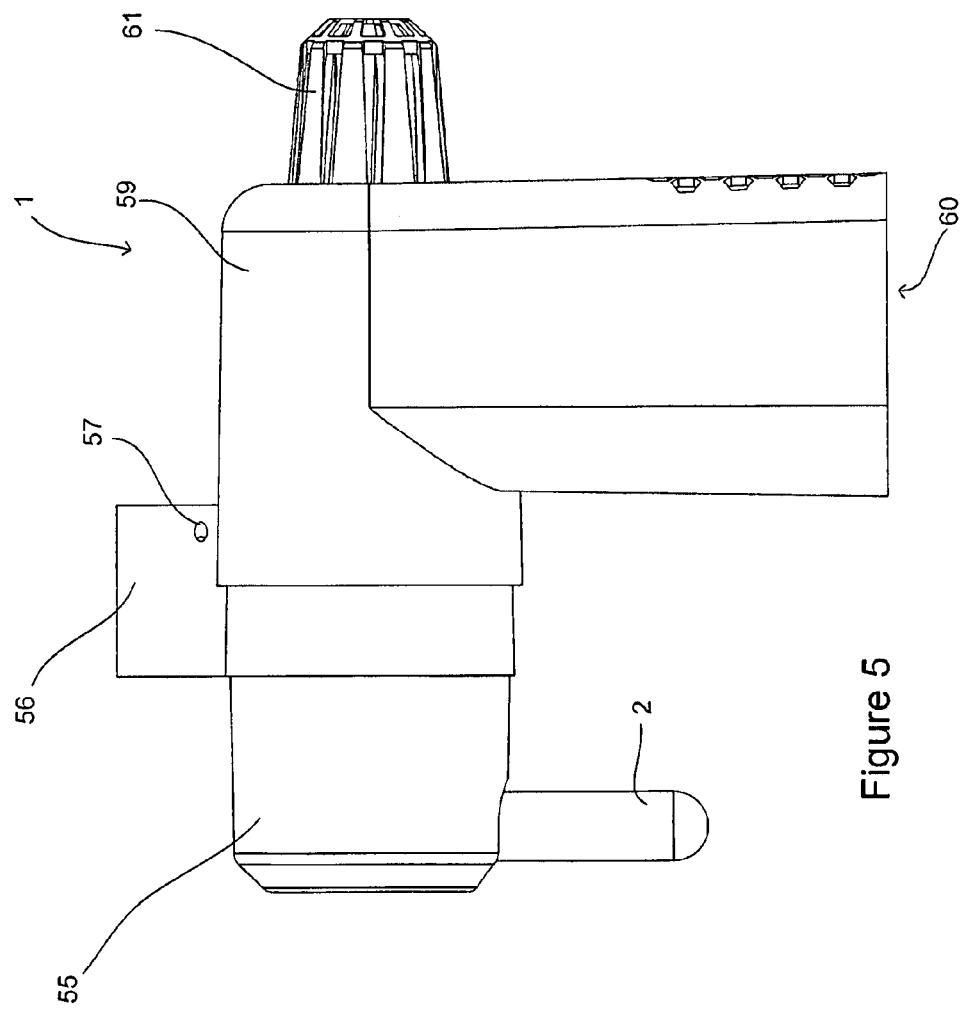
FIG. 5 is a side view of the trap of FIG. 1, with a housing and shroud fitted.
Figure 6:
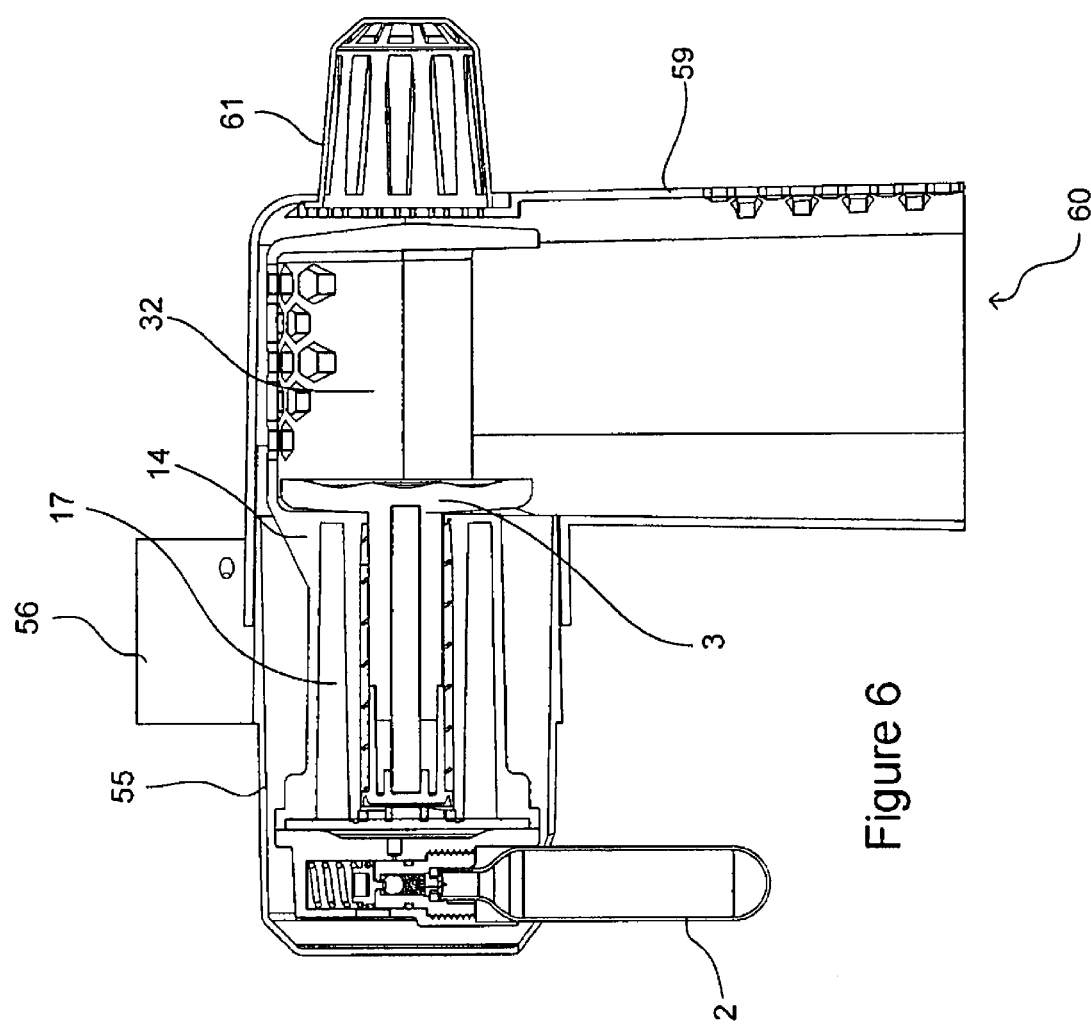
FIG. 6 is a cross-section through the trap of FIG. 5.
Figure 7:
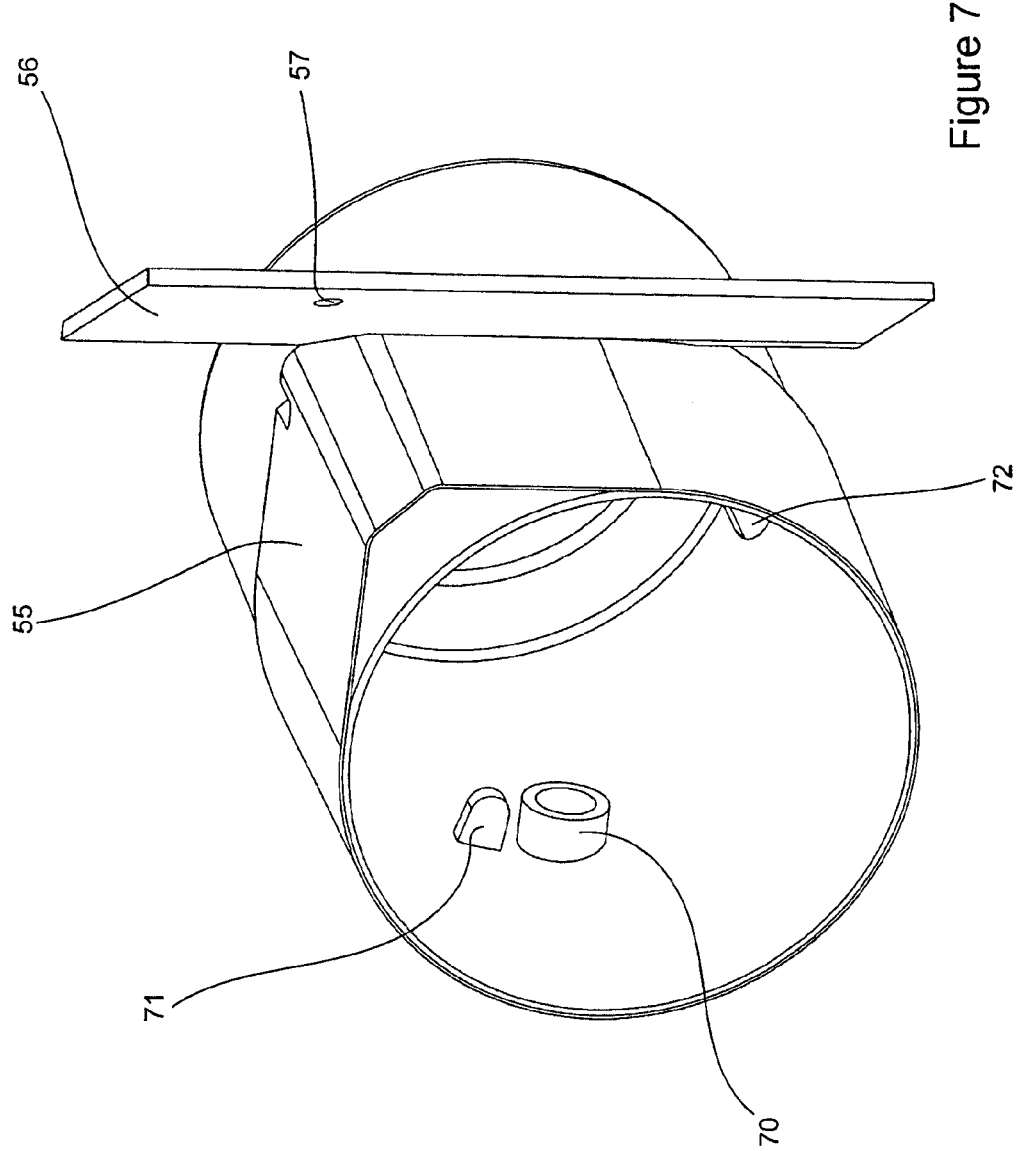
FIG. 7 is a perspective view of the housing of FIGS. 5 and 6.

The trap may include one or more enclosure elements at least partly surrounding the trap body 14, for example as shown in FIGS. 5 and 6. The enclosure elements may include a housing 55 (shown in detail in FIG. 7) which provides internal recesses 70 which receive the pivot connectors 50 of the trap body 14. Only one recess 70 is visible in FIG. 7. However, a corresponding recess is provided on the other side of the housing 55. The trap body 14 is therefore pivotally mounted with respect to the housing 55.

The housing 55 also includes a protrusion 71. The back surface (not visible in FIG. 7) of the protrusion 71 is the trigger surface against which the trigger valve presses when the trap body 14 pivots.

The housing 55 also includes a central bracket 56, preferably located near the pivot point, for attachment of the trap to a support, such as a tree, post or building. In the embodiment shown the bracket has a number of holes 57 for receiving appropriate fasteners. The skilled reader will understand that many different means of connecting the trap to a support could be suitable. An aperture 72 (FIG. 7) allows the compressed gas canister 2 to pass through the housing 55, as shown in FIG. 5.

The trap of FIGS. 5 and 6 also includes a shroud 59 which attaches to the housing 55 and extends over the right hand end (as shown) of the trap 1. The shroud provides an entranceway 60 through which an animal can enter the trap 1. The shroud 59 also includes a bait chamber 61 which is partially open to the inside of the entrance chamber 32. An animal is therefore attracted by bait in the bait chamber 61 but is unable actually to access the bait.

Optionally the bait chamber 61 may also be partially open to the outside of the trap 1, in order to more effectively attract animals to the trap 1.

The bait may be chosen specifically to target a chosen species or number of species.

Clearly the housing and shroud must be configured to allow sufficient rotation of the trap body under the weight of an animal to cause actuation of the trigger valve. In general the housing and shroud act to protect the trap and to ensure that animals enter the trap in the desired manner. The housing and shroud therefore contribute to the robustness of the trap and reduce the maintenance requirements.

Figure 8:
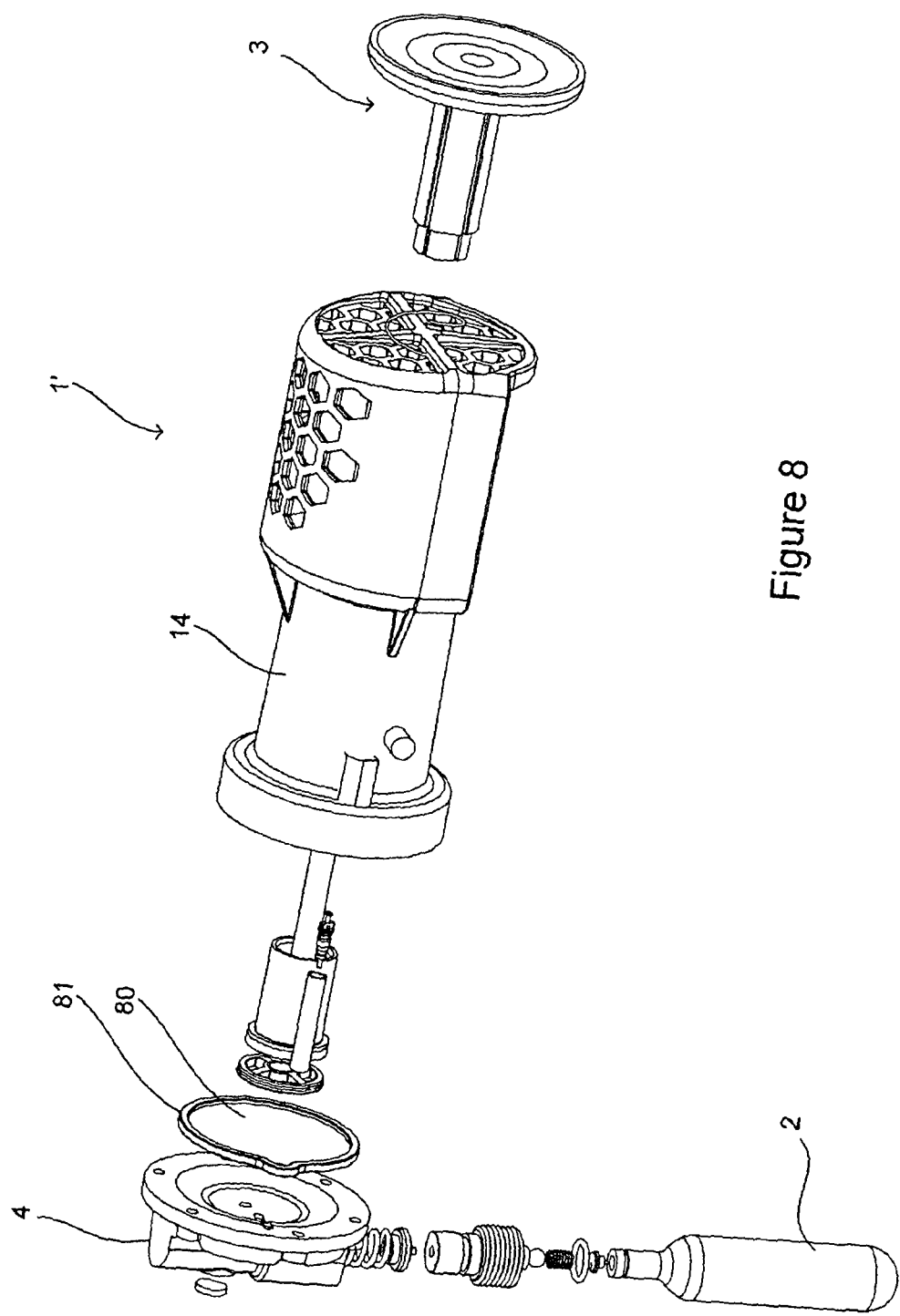
FIG. 8 is an exploded view of a trap according to a further embodiment.
Figure 9:
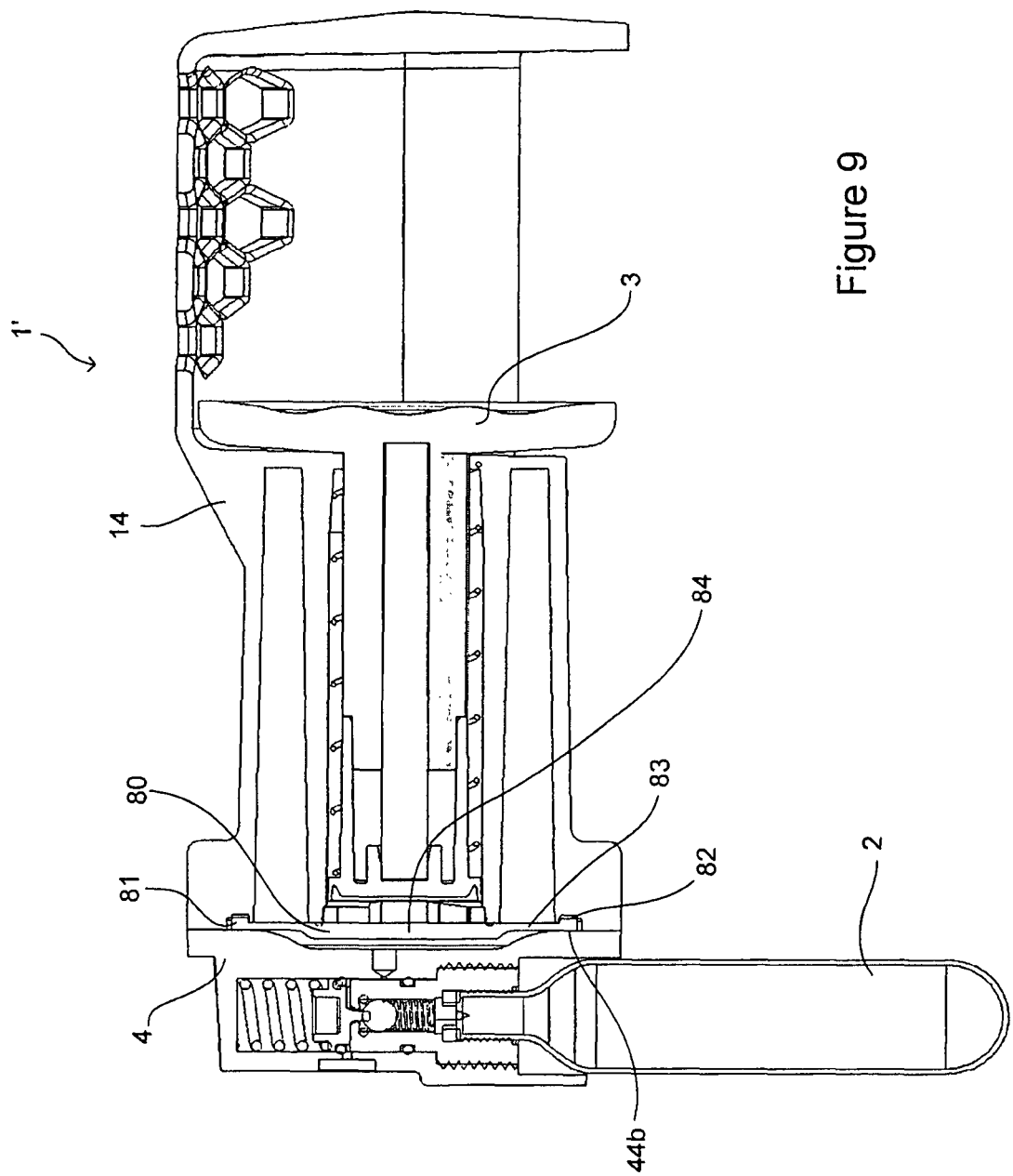
FIG. 9 is a cross-section through the trap of FIG. 8.
Figure 10:
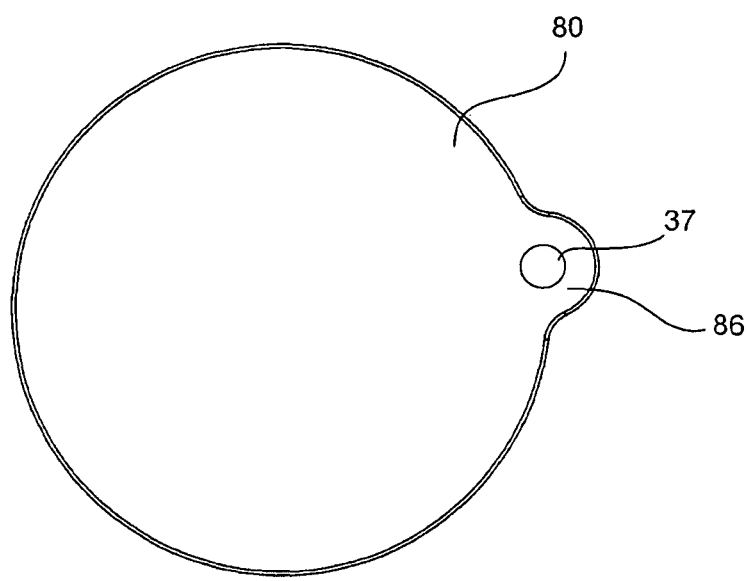
FIG. 10 shows a diaphragm from the trap of FIG. 8

FIGS. 8 to 10 show a further embodiment of trap 1'. The trap 1' is generally similar to the embodiment described above with reference to FIGS. 1 to 7. However, the diaphragm 80 is in this embodiment formed by a suitable moulding process, preferably injection moulding. While this may involve some extra cost over a diaphragm formed from sheet material, the moulding process allows more flexibility in design of the diaphragm.

The diaphragm 80 includes a thicker region 81 around its periphery, as can be seen most clearly in FIGS. 8 and 9. This thicker region essentially forms an o-ring for more effective sealing between the regulator cap 4 and the trap body 14. The thicker region 81 is received in a circular groove 82 formed in the surface of the trap body 14 which opposes the surface 44b of the regulator cap 4.

The diaphragm 80 also includes a thinner region 83, which in some embodiments may be around 1.5 mm in thickness. This thinner region 83 provides less resistance to stretching, which results in less resistance to flow from the reservoir to the kill mechanism when the trap is triggered.

Finally the diaphragm 80 includes a thicker central section 84 which reduces the tendency of the diaphragm to be forced through the bridge 20 into the inner cylinder 18. In one embodiment this thicker region may be around 3 mm thick.

FIG. 10 shows the general shape of the diaphragm 80, although the thinner and thicker regions cannot be seen in this view. The diaphragm is generally circular but includes a protrusion 86 which carries the hole 37. The diaphragm 80 does not include holes 11 (as in the above embodiment) because fasteners connecting the trap body 14 to the regulator cap 4 pass to the outside of the diaphragm's periphery.

FIGS. 11 to 14 show a further embodiment, which is a variation on the embodiments of FIGS. 1 to 10.

Figure 11:
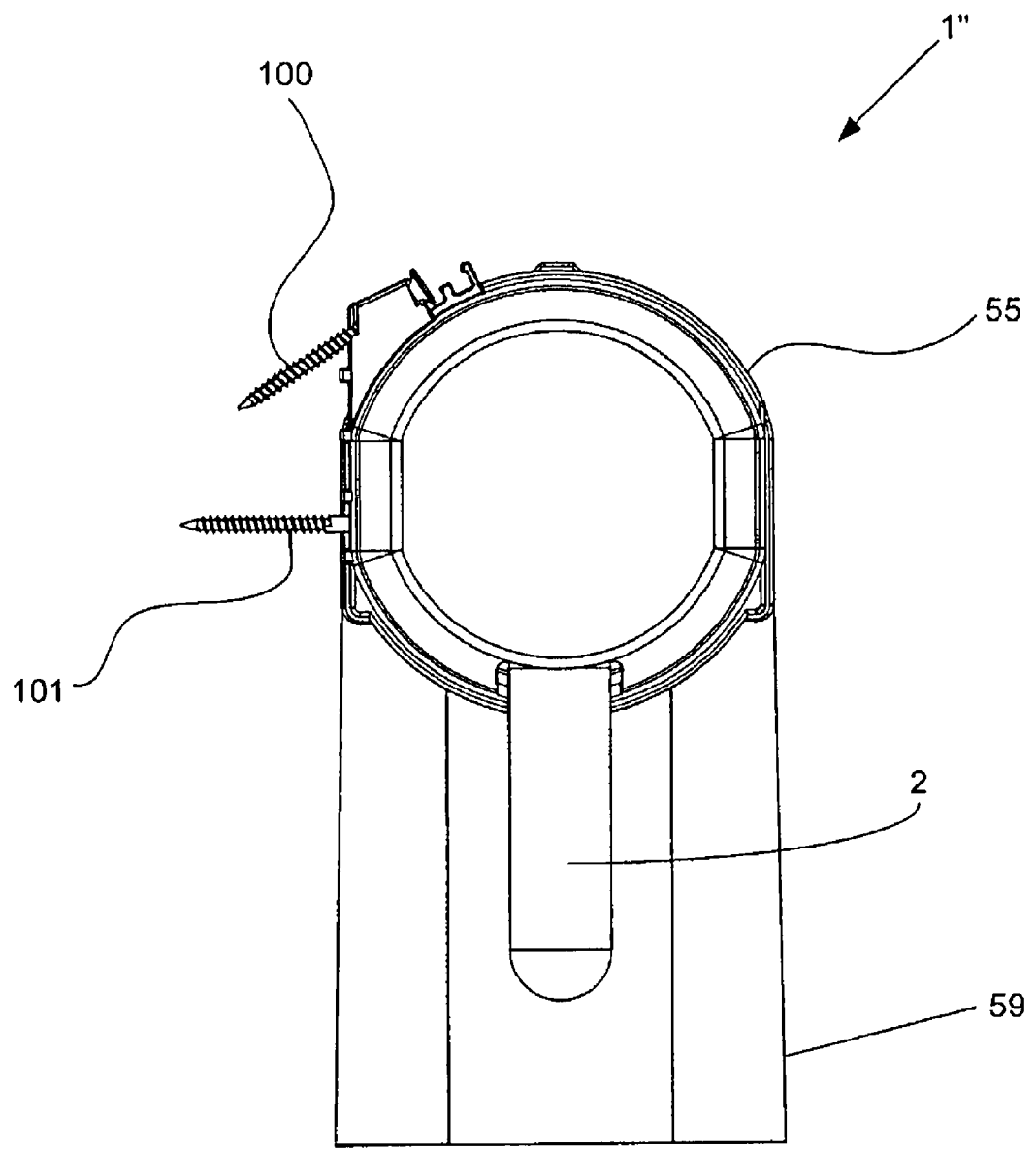
FIG. 11 is an end view of a further embodiment of trap.
Figure 12:
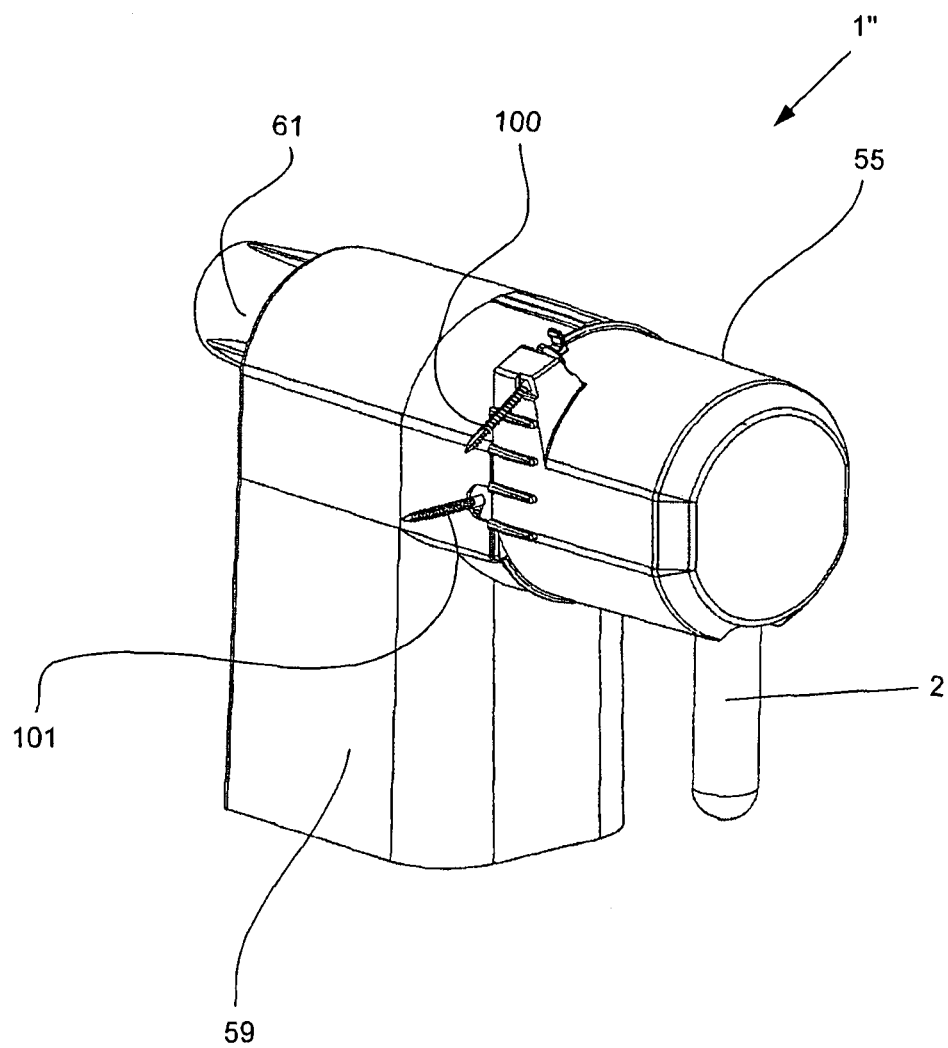
FIG. 12 is a perspective view of the trap of FIG. 11.

FIGS. 11 and 12 are end and perspective views of the complete trap with the housing 55 and shroud 59 in position. These drawings show an alternative mounting arrangement. Here a pair of screws 100, 101 can be used to attach the housing 55 to a support structure.

Figure 13:
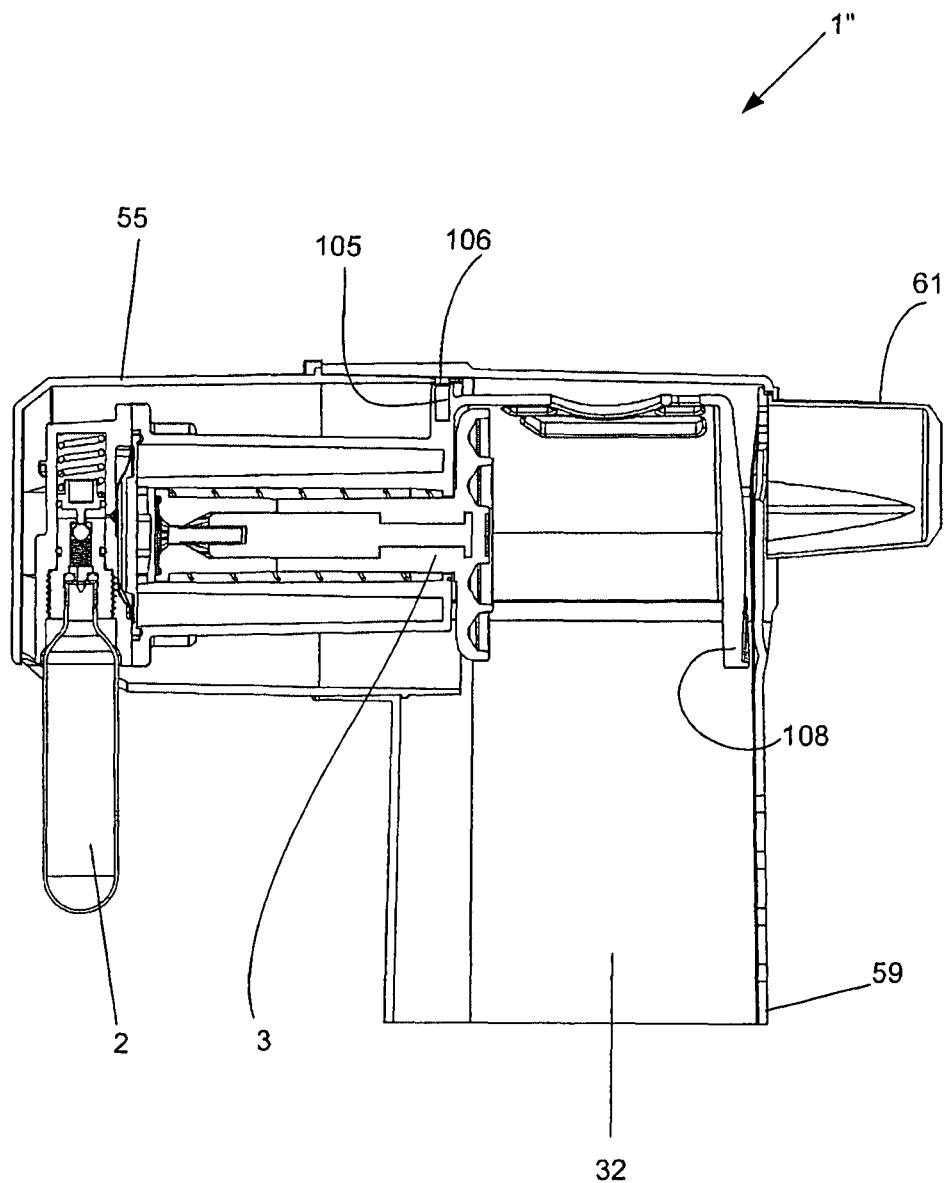
FIG. 13 is a cross-section through the trap of FIG. 11.
Figure 14:
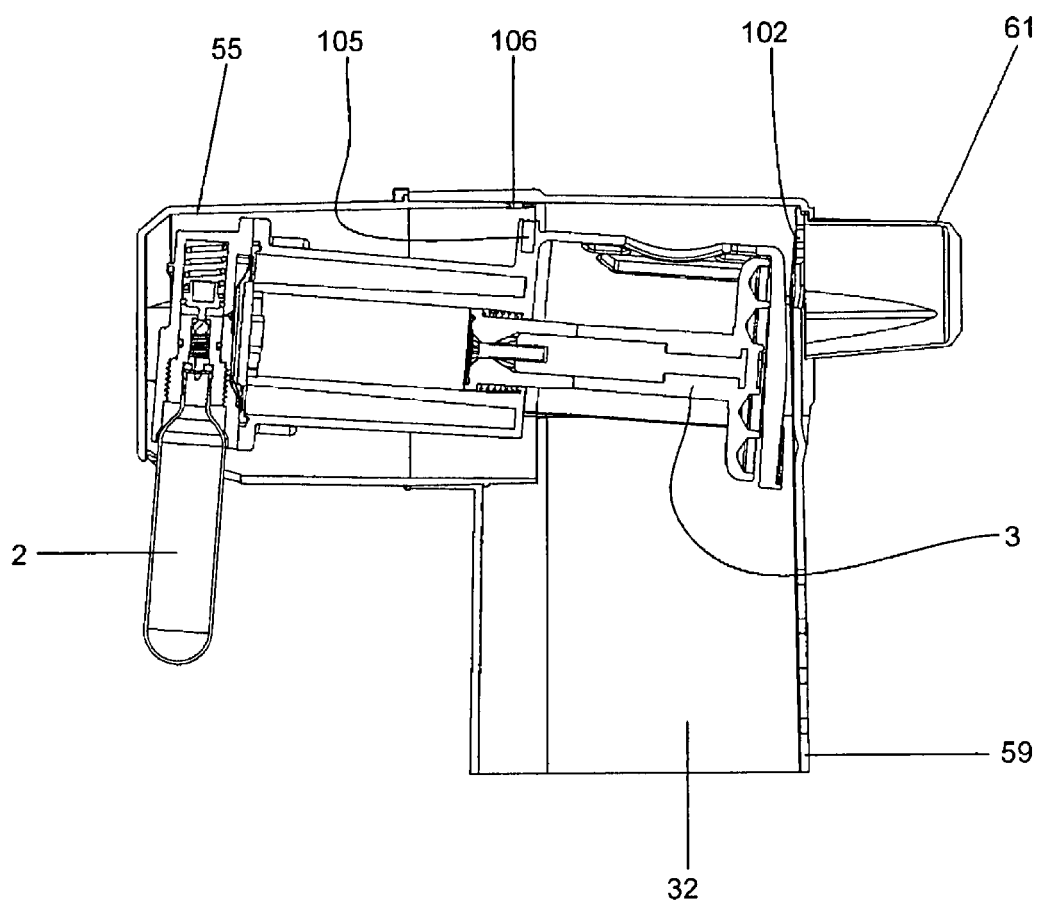
FIG. 14 is a further cross-section through the trap of FIG. 11, showing the trap in an actuated state.

As can be seen in FIG. 12 and also in the cross-sections of FIGS. 13 and 14, the bait housing 61 in this embodiment is closed to the outside of the trap but includes a number of openings 102 towards the inside of the entrance chamber 32. This has been found to provide adequate attractiveness to animals while reducing the potential for damage through animals clawing at the outside of the bait housing 61.

FIG. 13 shows first and second magnetic elements 105, 106. Both elements may be magnets, or one element may be a magnet while the other is not a magnet but is formed from a magnetic material. The magnetic elements 105, 106 attract each other to provide a small threshold force keeping the trap in the "ready" state of FIG. 13. The magnitude of the threshold force can be adjusted by setting the magnetic elements closer together or further apart. This helps to prevent premature actuation of the trigger and kill mechanism, as the threshold force must be overcome to actuate the trap. Other methods of applying a threshold force may be suitable, such as springs or suitable arrangement of the pivot with respect to the centre of gravity etc.

FIG. 14 shows the trap 1" in an actuated position. The weight of an animal applied to the end wall 108 of the trap body overcomes the threshold force from the magnetic elements and any torque applied by the weight of the trap body and causes the trap body to pivot with respect to the housing 55, as discussed above with reference to FIGS. 1 to 10. This results in actuation of the trigger mechanism and the sudden and forceful movement of the kill mechanism 3 to the right (as shown in the drawings). Clearly where an animal or part of an animal is in the trap, the kill mechanism will not travel to the fully extended position of FIG. 14, since the animal or part of the animal will be positioned between the kill mechanism 3 and the end wall 108 of the trap body.

The embodiment of FIGS. 11 to 14 is otherwise similar to those of FIGS. 1 to 10.

The traps shown in FIGS. 1 to 14 use a hammer as the kill mechanism 3. The surface 52 of the hammer is formed with a wavy surface. A crenelated surface may be used and would provide the greatest effectiveness in killing animals, because the point loading of the high points of the crenelations causes significant localised damage to the animal. However, a crenelated surface also provides good footholds for animals, such that they tend to climb on it. This may prevent proper operation of the kill mechanism. The hammer therefore uses a wavy surface which provides some point loading but does not allow an animal to gain a foothold on the surface.

FIGS. 15 to 20 shows a further embodiment designed for the control of possums in New Zealand. However, this design, or adaptations of this design, will also be suitable for control of other pests.

Figure 15:
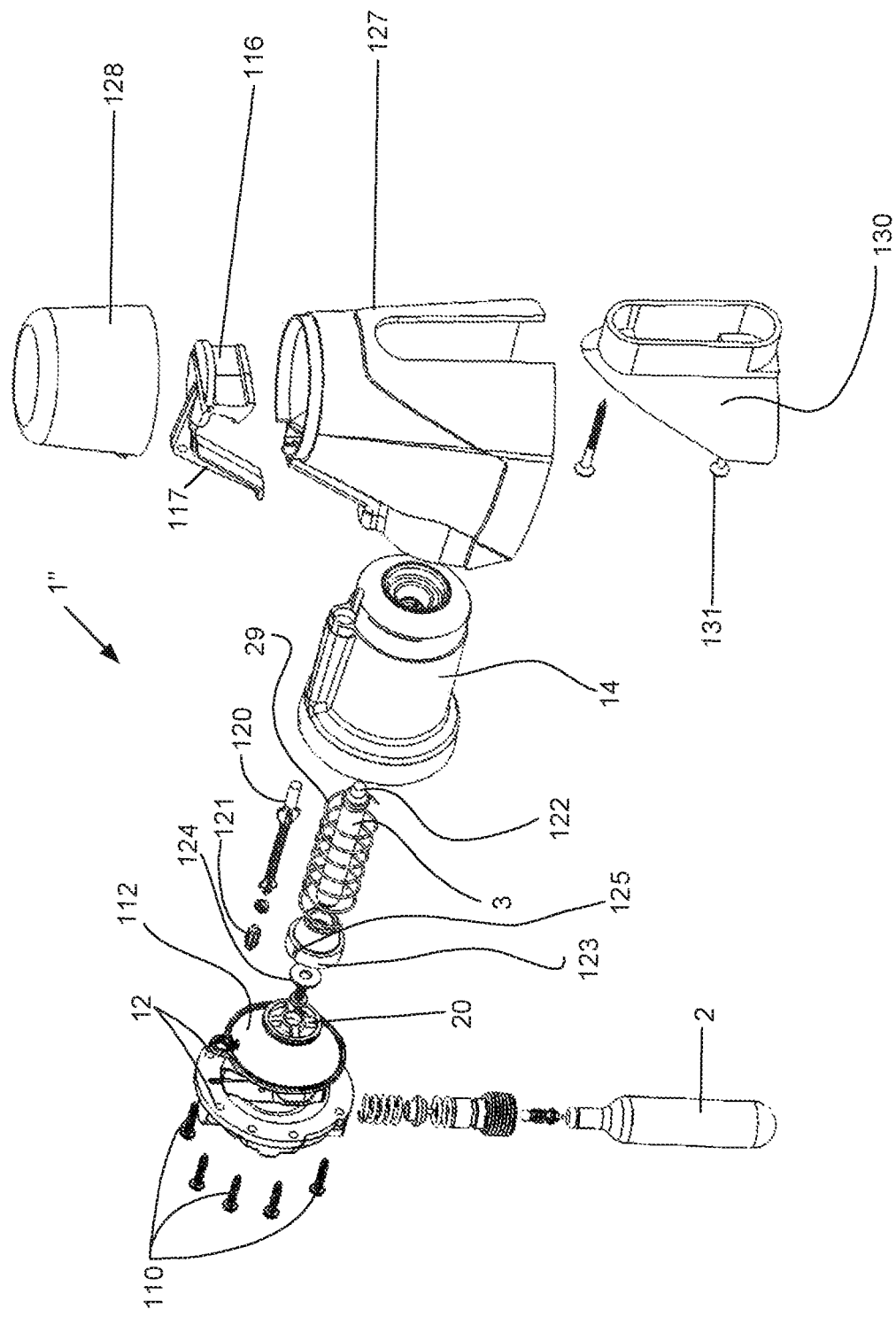
FIG. 15 is an exploded view of a further embodiment of trap.
Figure 16:
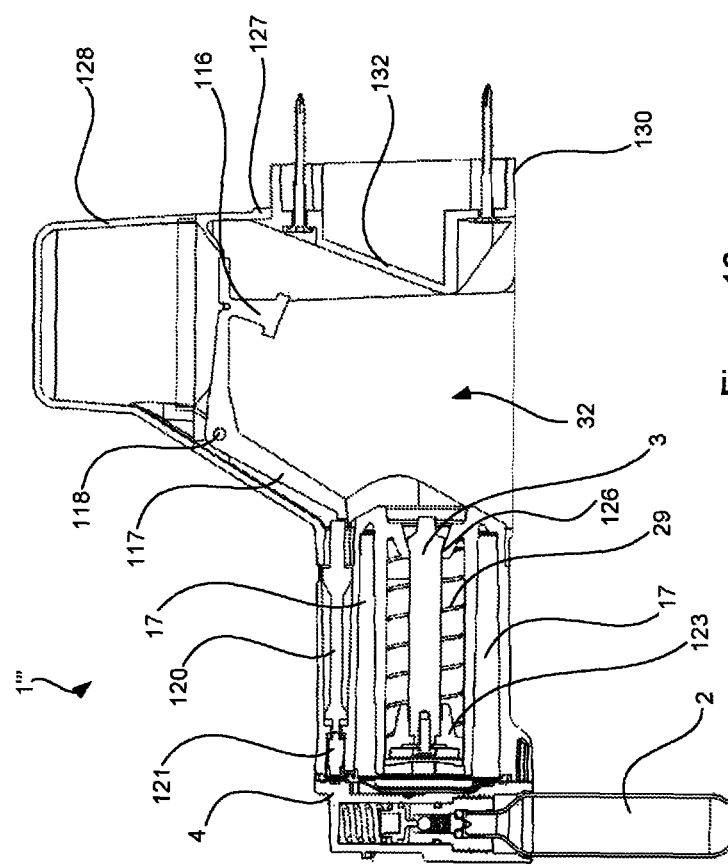
FIG. 16 is a cross-section through the trap of FIG. 15

As is clear from the exploded view of FIG. 15 and the cross-section of FIG. 16, the trap 1''' includes a gas source 2, regulator assembly 5 and regulator cap 4 similar to those elements described above. A number of holes 12 in the regulator cap 4 receive screws 110 for joining the regulator cap 4 to the trap body 14.

Figure 19:
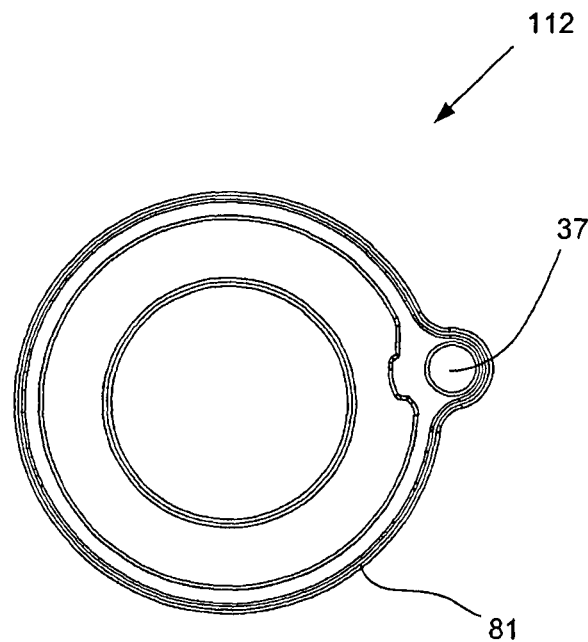
FIG. 19 is a plan view of the diaphragm of the trap of FIG. 15.
Figure 20:
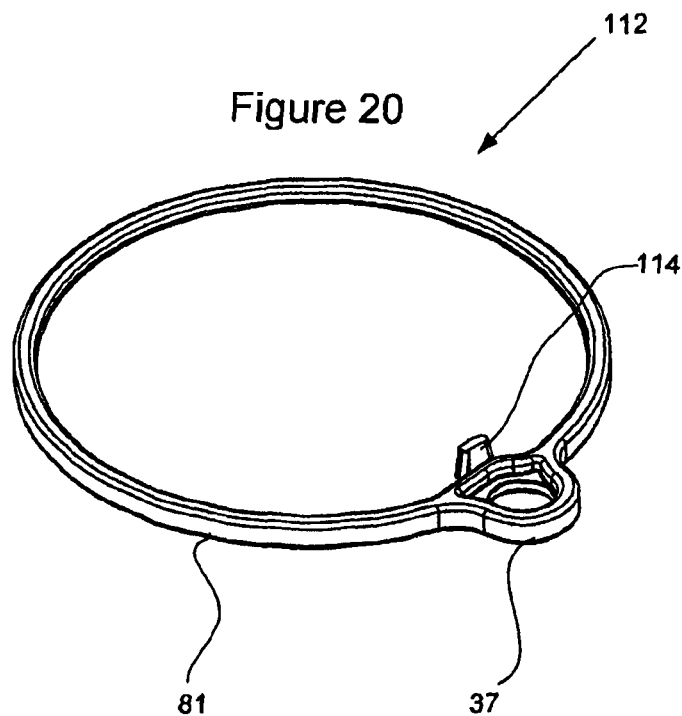
FIG. 20 is a perspective view of the diaphragm of FIG. 19.

A diaphragm 112 is positioned similarly to the diaphragm 80 of FIGS. 8 to 10 (although positioned with the hole 37 towards the top of the trap), and is shown in more detail in FIGS. 19 and 20. FIG. 19 is a plan view of the back side of the diaphragm, which in the assembled trap 1''' sits adjacent the front surface of the regulator cap. This view shows the profiled nature of the diaphragm 112, which is also clear in FIG. 16.

FIG. 20 shows the front surface of the diaphragm. A non return valve 114 in the form of a small protrusion can be moulded into the diaphragm. By pressing against the end of a flow groove formed in the wall of the trap body, this valve helps to prevent unwanted flow of gas from the front side of the diaphragm to the back side of the diaphragm (i.e. from right to left as shown in the drawings).

Returning to FIG. 16, gas flows from the gas source into the intermediate reservoir 17 in a similar manner to that described above.

The trigger arrangement and kill mechanism differ from the embodiments described above and will therefore be described in detail.

In this embodiment a trigger actuator in the form of a biter 116 is mounted to a lever arm 117 which pivots around a pin 118. Some pests, including possums, have a tendency to bite on baited objects and pull. When pulled in this manner, the biter 116 and lever arm 117 pivot and force a rod 120 to move to the left (as shown in the drawings). The rod 120 presses against the end of a trigger valve 121. This allows gas to flow from the front side of the diaphragm, through the trigger valve 121 and past the rod 120, allowing gas to flow from the intermediate reservoir 17 to the kill mechanism, in a similar manner to that described above. The rod 120 may be formed with a cruciform cross-section (see FIG. 15) in order to allow this flow of gas.

As an alternative to this form of biter, a biter with two parts which are brought together by the animals bite could be used, with one or both parts mechanically linked to the trigger valve in a suitable manner. Other trigger actuators may be suitable for some applications, for example: mechanical treadles or levers actuated when an animal stands on or presses against the treadle or lever; or electronic or optical sensor actuators configured to sense an animal and fire the trigger electromechanically.

Figure 21:
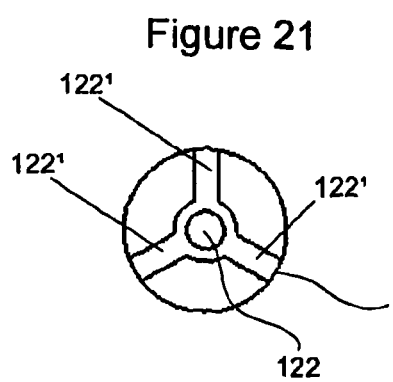
FIG. 21 is an end view of one embodiment of kill mechanism.
Figure 21A:
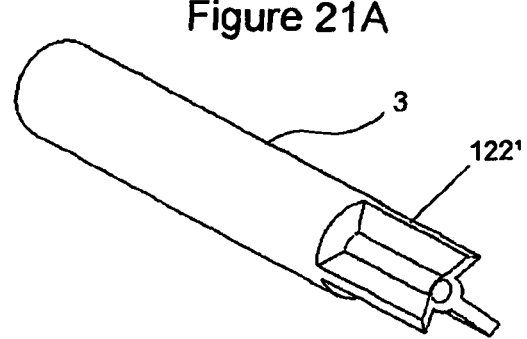
FIG. 21A is a perspective view of the kill mechanism of FIG. 21.
Figure 21B:
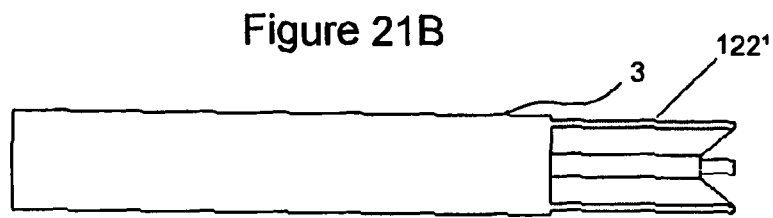
FIG. 21B is a side view of the kill mechanism of FIG. 21.

The kill mechanism 3 is essentially a hammer or rod with a narrowed portion 122 at its end. FIG. 21 is an end view of a preferred kill mechanism, in which a number of radial protrusions 122' extend from the narrowed portion 122. FIGS. 21A and 21B are perspective and side views of this embodiment of kill mechanism. These radial protrusions help to cause the maximum possible damage to the animal's skull in as short a time as possible so as to kill the animal as quickly and humanely as possible.

A rubber seal 123 is attached to the other end of the kill mechanism 3 by a screw and washer 124 such that the seal and rod are driven to the right by the sudden flow of gas from the intermediate reservoir. The seal 123 has a number of grooves 125 formed in its periphery. After actuation, this allows gas pressure to be released past the seal 123, allowing the kill mechanism to return to the left after a relatively short period of time under the force applied by the spring 29. Grooves are preferably also formed in the wall 126 (FIG. 16) to allow gas to escape past the kill mechanism into the entrance chamber 32. This speedy release is desirable for heavy pests such as possums, since it reduces the chance of the possum's weight being applied to the kill mechanism and potentially preventing proper re-setting of the trap.

When the animal falls from the trap, its weight is released from the biter 116, the rod 120 is free to return to the right, the trigger valve 121 closes and gas pressure once again builds up in the intermediate reservoir 17.

In this embodiment a shroud or housing 127 mounts to the trap body 14 and defines an entrance chamber 32. The biter 116 is positioned at the top of the entrance chamber 32 beneath a cap 128. The biter itself may be baited (manually or automatically) or in some other way made attractive to the target pest. A bait may be held in the space under the cap 128. Alternatively some form of bait dispenser may be provided under the cap 128 in order to dispense bait onto the biter 116.

To mount the trap to a support (e.g. a post or tree), a bracket 130 is attached to the support using a number of screws 131 or other suitable fasteners. The shroud 127 is configured to engage over the top of the bracket 130, thereby mounting the trap to the support.

As shown in 16, the bracket may be shaped to provide a protrusion 132 within the entrance chamber. The position of the trap relative to the support, the position of the chamber 32 and the protrusion 132 all help to ensure that a possum is most likely to enter the chamber with its stomach towards the right (as shown). When a possum pulls on biter 116 the kill mechanism precisely and reliably strikes the possum in a weak zone on the top of the skull, quickly causing fatal damage. The possum is therefore killed in a very humane manner due to the design of the kill mechanism, the geometry of the entrance chamber and the position of the trap relative to a support.

When intended for possums, the trap preferably has a dimension of around 100 mm from the entrance up to the biter.

Figure 17:
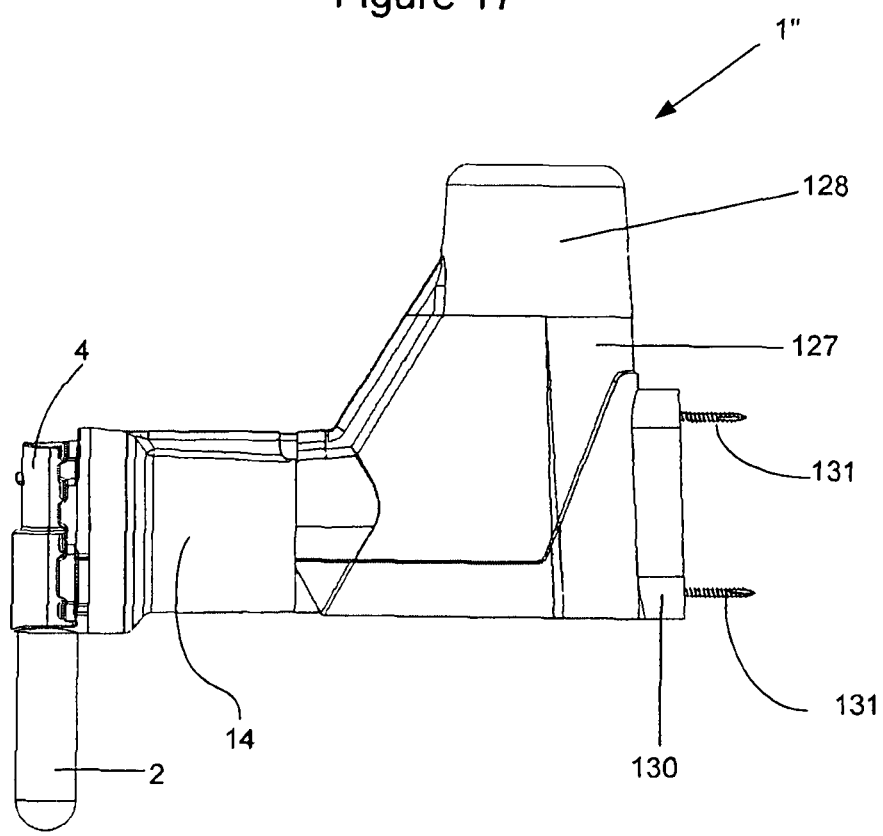
FIG. 17 is a side view of the trap of FIG. 15.
Figure 18:
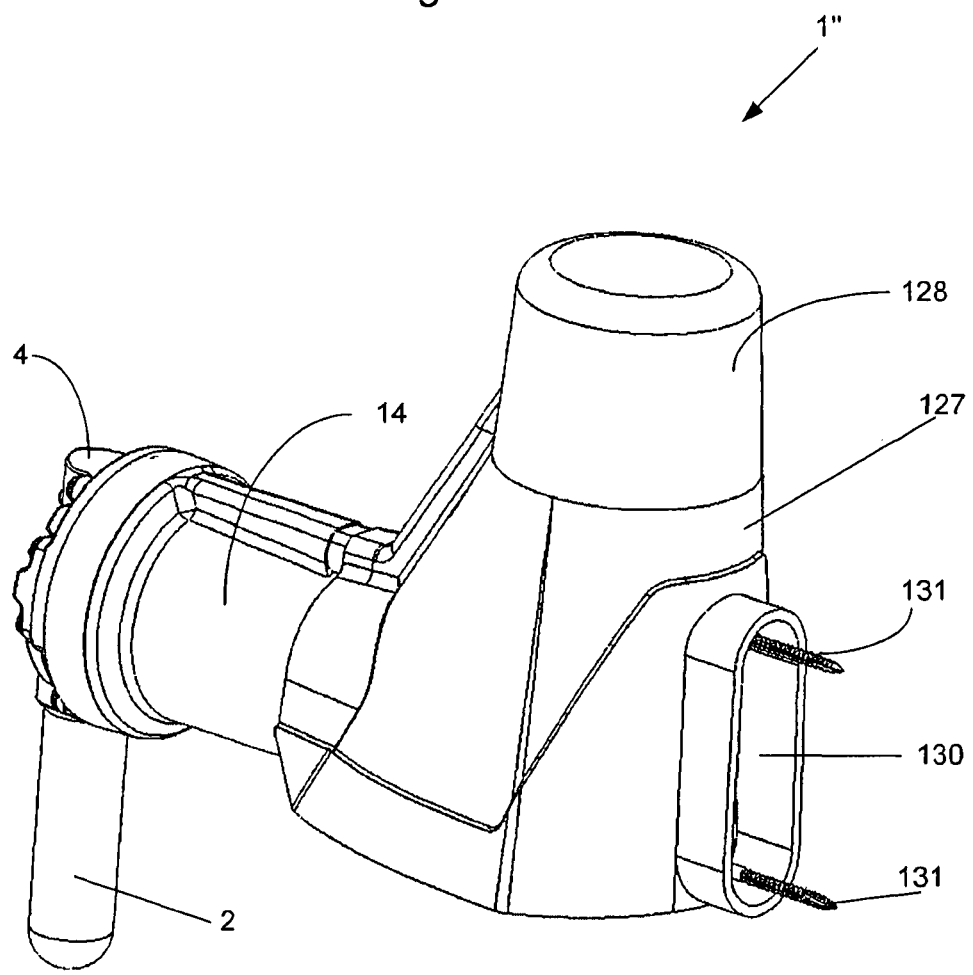
FIG. 18 is a perspective view of the trap of FIG. 15

FIGS. 17 and 18 are side and perspective views respectively of the assembled trap 1'''.

Figure 22:
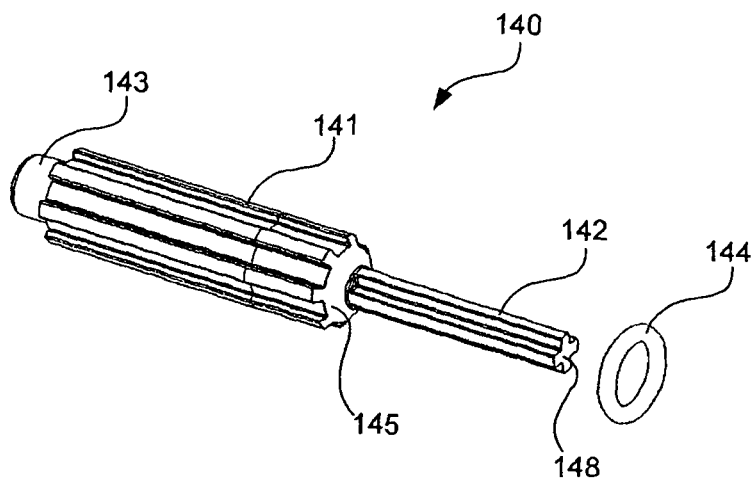
FIG. 22 is a perspective view showing one embodiment of trigger valve body.

FIG. 22 illustrates a trigger valve mechanism which may be used in any of the embodiments discussed herein, instead of a Schrader valve. It has been found that Schrader valves leak gas when used without a rubber cap, which undesirably leads to leaking of gas from the reservoir over time, increasing the servicing requirements of the trap.

The trigger valve 121 includes a trigger valve body 140 which is formed in three sections. A first fluted section 141 is formed with a second fluted section 142 and a protrusion 143 extending from either end. An o-ring seal 144 is dimensioned to sit against the shoulder 145 where the first and second fluted sections meet.

Figure 23:
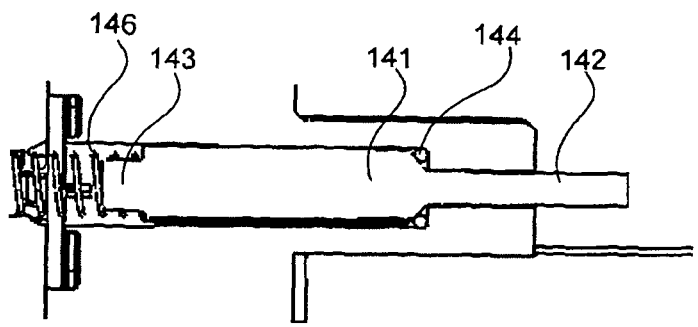
FIG. 23 is a cross-section of part of a trap body showing the trigger valve body of FIG. 22 in position.

FIG. 23 shows the trigger valve body 140 and o-ring 144 installed in a trap body. A valve spring 146 biases the valve body 140 to the right (as shown). The valve body 140 rides within a cavity that is shaped such that the shoulder 145 presses against the end of the cavity while the second fluted section 142 passes through an aperture out of the cavity. In this position the o-ring is pressed between the shoulder 145 and the end of the cavity and seals the ends of the flutes 147 of the first fluted section 141, such that gas cannot flow through the valve.

When a trigger mechanism presses, or causes some other element to press, against the end 148 of the valve body 140, the valve body 140 moves to the left against the force applied by the valve spring 146. The o-ring is no longer pressed between the shoulder 145 and the end of the cavity, such that gas can flow along the flutes of the first fluted section and out of the cavity along the flutes of the second fluted section.

The trap may include any suitable form of lure for attracting an animal. Various forms of lure in the form of baits and bait arrangements are discussed above, but visual lures may also be used. A bait arrangement may be any form of bait or arrangement for receiving bait. The lures used may be selected or designed for a particular target animal.

In addition to the kill mechanisms described above, other configurations of hammers, spikes etc may be used. A spike could be used to strike the animal on the back of the skull, for example. However, the hammer shown in the drawings provides a fairly wide surface area and is therefore more likely successfully to kill the animal.

Other kill mechanisms may be suitable. For example, a guillotine or other cutting element could be sued to decapitate an animal, or cut its throat or otherwise kill the animal by some cutting action.

Alternatively, nooses, chords, straps or cables could all be drawn tight around the animal by a compressed gas-powered mechanism. A pair of moving bars could be moved together or a single bar could move towards a fixed surface.

Where constriction mechanisms such as nooses, chords, straps, cables or moving bar arrangements are used it becomes important to hold the animal over a predetermined period of time, because the animal will die due to restrictions on its breathing or blood flow. Preferably the animal is held for at least three minutes, more preferably at least six minutes. The constriction means can be held in place by compressed gas pressure or some form of mechanical latch arrangement.

Preferably compressed gas is used, with a variation of the above flow arrangement ensuring that pressure is maintained for the predetermined period of time and then released. In this variation, the diaphragm may be used to block off the supply of gas from the source, when the trap is triggered, in order to prevent waste of gas. Clearly the seal around the kill mechanism (in the embodiment shown in the drawings the seal between the flange 26 and the inner cylinder walls) would need to be fairly tight in order to prevent pressure from leaking away too quickly.

The gas pressure can then be leaked over time through a pneumatic micro bleed. It may be possible to tune this bleed to the predetermined period of time. Once this has bled the gas to a certain pressure, the seal at the top of the piston will 'collapse' and allow the gas to quickly escape, thereby allowing the piston to retract, the diaphragm to close and the intermediate reservoir to refill.

It may be possible to provide a "dose" of compressed gas to the kill mechanism in some alternative manner, i.e. by a controlled discharge from the gas source into the kill mechanism without the use of an intermediate reservoir.

The Applicant's trap provides a number of desirable advantages. The use of compressed gas allows for a simple yet powerful mechanism. The simplicity of the mechanism means that the trap is robust and can be installed in remote locations without the need for regular maintenance. The trap is self-resetting, so that killed animals are released from the trap and the trap is quickly ready to kill another animal. The use of compressed gas provides significant advantages over previous designs, including complex designs relying on the use of explosive charges, which are more costly, difficult to use, potentially dangerous and impose a number of undesirable design restrictions. For the avoidance of doubt, the term "source of compressed gas" does not include explosive charges.

The Applicant's traps are relatively light and compact. The traps can be formed predominantly from light, cheap materials such as moulded plastics. This means that large numbers of the traps can be carried by a worker in the field.

These features mean that the trap need only be serviced when the supply of compressed gas needs to be replenished. A small $CO_2$ cylinder (of the type used in air rifles, for example) provides a significant number of trap operations. For example, a rat and stoat trap such as that described above is expected to operate around 12 times before the compressed gas source needs to be replenished. In the New Zealand environment such a trap would need to serviced around once a year. Larger gas sources will of course be longer lasting.

Alternatively the use of compressed gas also allows the use of simple gas reservoirs which can be re-pressurised by users using commonly available pumps, such as bicycle tyre pumps for example. Simple reservoirs could even be formed from recycled bottles or the like. Simple gas reservoirs may not require a regulator to be used. Some embodiments may use high pressure sources without a regulator. There are advantages in using gas at higher pressure, such as fewer parts and a smaller trap size as there is no need for an intermediate reservoir. On the other hand, higher pressures result in high forces for triggering the trap, which smaller animals such as rats or stoats cannot achieve. This problem can of course be overcome with larger target animals capable of providing higher forces.

In some embodiments the Applicant's trap also replaces the traditional delicate treadle trigger with a robust pivoting arrangement of the trap body under the animal's weight. Again, this increase the reliability of the trap. However, in some embodiments other types of trigger mechanisms may be used, such as magnet latches or alternative mechanical triggers.

The Applicant's trap is capable of adaptation for many different pests or groups of pests, including but not limited to: rats, stoats, possums, ferrets, birds, mongoose, muskrat, mink, beaver, nutria, squirrel, snakes, monitor lizards, cats, foxes, dogs and ungulets. Clearly, the nature of the pests will depend on the country where the trap is used. The Applicant's trap can target any desired animal through its installation (e.g. height above ground), size of the opening in the housing, arrangement of the trigger mechanism (e.g. to target an animal in a particular weight range) and the use of a particular bait.

The Applicant's power unit can drive many different types of kill mechanism. This allows the same power unit to be used with different kill mechanisms suitable for different applications.

The power unit may be provided in a modular form for connection to any desired kill mechanism, housing and/or compressed gas source etc. In this case the power unit may include standard attachment arrangements for attachment of different kill mechanisms or gas sources. The power unit may be provided in kit form together with a suitable kill mechanism.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A trap including:
   i. a trap body including a chamber accessible via an animal entranceway;
   ii. a source of compressed gas;

iii. a trigger mechanism configured to be actuated by an animal with the chamber, the trigger mechanism including at trigger valve;
iv. a kill mechanism powered by the compressed gas including a hammer which is driven into the chamber when activated; and
v. a diaphragm that in a ready state blocks flow of the compressed gas to the kill mechanism;

wherein, when the trigger mechanism is actuated by the animal, the trigger valve allows gas to flow to alter a pressure difference across the diaphragm, causing the diaphragm to move so as to allow the compressed gas to flow to actuate the kill mechanism to kill the animal by driving the hammer into the chamber.

2. A trap as claimed in claim 1, wherein the kill mechanism is configured to automatically release a killed animal and to reset so as to be ready to kill a further animal.

3. A trap as claimed in claim 1 configured to target a particular animal or group of animals.

4. A trap as claimed in claim 3 wherein the trap is configured to target the animal or group of animals which are drawn from the group: rats, possums, ferrets, birds, mongoose, muskrat, mink, beaver, nutria, squirrel, snakes, monitor lizards, cats, foxes, dogs, and ungulates.

5. A trap as claimed in claim 1 wherein the compressed gas is carbon dioxide or air.

6. A trap as claimed in claim 1 wherein the source of compressed gas is selected from a group including: a replaceable canister; and a reservoir configured to be re-pressurised by a user.

7. A trap as claimed in claim 1 wherein the trigger mechanism includes a trigger actuator configured to be actuated by an animal and to cause actuation of the trigger valve, and wherein the trigger actuator is a biter, mechanical treadle or lever, or electronic or optical sensor actuator.

8. A trap as claimed in claim 1 wherein in a setting state, resetting state or in the ready state pressure acts on one surface of the diaphragm to prevent flow of the compressed gas to the kill mechanism.

9. A trap as claimed in claim 1 wherein the diaphragm is formed from a resilient material.

10. A trap as claimed in claim 1, further including an intermediate reservoir, wherein the diaphragm includes a hole allowing the compressed gas to flow from the source of compressed gas, through the diaphragm to the intermediate reservoir.

11. A trap as claimed in claim 10 wherein the intermediate reservoir is an annular reservoir surrounding a central cylinder in which a piston of the kill mechanism rides.

12. A trap as claimed in claim 11 wherein in a setting state, resetting state or in the ready state the diaphragm blocks an end of the central cylinder, and the movement of the diaphragm when the animal actuates the trigger mechanism is away from the end of the central cylinder such that the compressed gas flows from the intermediate reservoir into the central cylinder to act on the piston.

13. A trap as claimed in claim 1 including a time delay arrangement to cause release of the animal and resetting of the trap at an end of a predetermined period.

14. A trap as claimed in claim 1 including a bait arrangement or lure for attracting the animal.

15. A trap as claimed in claim 1 including an intermediate reservoir, wherein in a setting or resetting state the compressed gas is allowed to flow to fill the intermediate reservoir, and when an animal actuates the trigger mechanism the compressed gas flows from the intermediate reservoir to the kill mechanism to actuate the kill mechanism.

16. A trap as claimed in claim 1 wherein the kill mechanism includes a piston actuated by the compressed gas.

17. A trap including:
i. a trap body including a chamber accessible via an animal entranceway;
ii. a source of compressed gas;
iii. a trigger mechanism configured to be actuated by an animal within the chamber;
iv. a kill mechanism including a piston powered by the compressed gas and a hammer formed integrally with the piston or carried on an end of the piston;
v. a diaphragm that in a ready state blocks flow of the compressed gas to the kill mechanism; wherein, when the trigger mechanism is actuated by the animal, the trigger mechanism allows the compressed gas to flow to alter a pressure difference across the diaphragm, causing the diaphragm to move so as to allow the compressed gas to flow to actuate the piston of the kill mechanism, which is arranged to move the hammer into the chamber to strike the animal, thereby killing the animal.

18. A trap as claimed in claim 17, wherein the kill mechanism is configured to automatically release a killed animal and to reset so as to be ready to kill a further animal.

19. A trap as claimed in claim 17 wherein the trigger mechanism includes a trigger valve, such that the flow of the compressed gas which is allowed by the trigger valve when it is actuated causes actuation of the kill mechanism.

20. A trap as claimed in claim 17, wherein the trigger mechanism includes a trigger actuator and a trigger valve, wherein the trigger actuator is configured to be actuated by the animal and to cause actuation of the trigger valve.

21. A trap as claimed in claim 17 including an intermediate reservoir, wherein in a setting or resetting state the compressed gas is allowed to flow to fill the intermediate reservoir, and when the animal actuates the trigger mechanism compressed gas flows from the intermediate reservoir to the kill mechanism to actuate the kill mechanism.

22. A trap as claimed in claim 17 including an intermediate reservoir, wherein in a setting or resetting state the compressed gas is allowed to flow to fill the intermediate reservoir, and when the animal actuates the trigger mechanism the compressed gas flows from the intermediate reservoir to the kill mechanism to actuate the kill mechanism, wherein the intermediate reservoir is an annular reservoir surrounding a central cylinder in which the piston of the kill mechanism rides.

* * * * *